United States Patent
Wu et al.

(10) Patent No.: US 9,706,214 B2
(45) Date of Patent: Jul. 11, 2017

(54) IMAGE AND VIDEO DECODING IMPLEMENTATIONS

(75) Inventors: Yongjun Wu, Bellevue, WA (US); Shyam Sadhwani, Bellevue, WA (US); Daniele Terdina, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1349 days.

(21) Appl. No.: 12/978,501

(22) Filed: Dec. 24, 2010

(65) Prior Publication Data

US 2012/0163470 A1    Jun. 28, 2012

(51) Int. Cl.
| | | |
|---|---|---|
| *H04N 7/50* | (2006.01) | |
| *H04N 19/44* | (2014.01) | |
| *H04N 19/176* | (2014.01) | |
| *H04N 19/122* | (2014.01) | |
| *H04N 19/127* | (2014.01) | |
| *H04N 19/14* | (2014.01) | |

(Continued)

(52) U.S. Cl.
CPC ........ *H04N 19/44* (2014.11); *H04N 19/122* (2014.11); *H04N 19/127* (2014.11); *H04N 19/14* (2014.11); *H04N 19/176* (2014.11); *H04N 19/436* (2014.11); *H04N 19/46* (2014.11)

(58) Field of Classification Search
CPC ........ H03M 7/42; H03M 7/3059; H04N 7/50; H04N 7/26106; H04N 7/26244; H04N 7/26313; H04N 7/30
See application file for complete search history.

(56) References Cited

U.S. PATENT DOCUMENTS

| | | |
|---|---|---|
| 4,309,754 A | 1/1982 | Dinwiddie, Jr. |
| 4,642,756 A | 2/1987 | Sherrod |

(Continued)

FOREIGN PATENT DOCUMENTS

| | | |
|---|---|---|
| CN | 1366775 | 8/2002 |
| CN | 1960472 | 5/2007 |

(Continued)

OTHER PUBLICATIONS

Office Action dated Jan. 6, 2014, from Chinese Patent Application No. 201110441018.1, 5 pp.

(Continued)

*Primary Examiner* — Obafemi Sosanya
(74) *Attorney, Agent, or Firm* — Klarquist Sparkman, LLP

(57) ABSTRACT

Efficient operations in image or video decoding. For example, a tool such as an image or video decoder receives and decodes encoded data for a picture in a bitstream. As part of the decoding, the tool adapts a multi-symbol lookup table to use in decoding of symbols then decodes the symbols using the multi-symbol lookup table, producing exactly correct results. The tool can also perform selectively truncated inverse frequency transforms. For a given block, the tool identifies upper horizontal and vertical frequencies among non-zero coefficients for the block and, based on the upper frequency values, selectively applies a simplified inverse frequency transform to transform coefficients for the block without hurting decoding quality. Using restart markers in the bitstream, the tool can organize multiple blocks of the picture as partitions. The tool decodes at least some of the partitions in parallel on a partition-by-partition basis using multiple processing cores.

7 Claims, 10 Drawing Sheets

(51) Int. Cl.
*H03M 7/40* (2006.01)
*H04N 19/46* (2014.01)
*H04N 19/436* (2014.01)

(56) References Cited

U.S. PATENT DOCUMENTS

| | | | |
|---|---|---|---|
| 5,465,335 A | 11/1995 | Anderson | |
| 5,694,179 A | 12/1997 | Kwak et al. | |
| 5,734,783 A | 3/1998 | Shimoda et al. | |
| 5,909,559 A | 6/1999 | So | |
| 6,002,801 A | 12/1999 | Strongin et al. | |
| 6,006,303 A | 12/1999 | Barnaby et al. | |
| 6,105,048 A | 8/2000 | He | |
| 6,219,502 B1 | 4/2001 | Osari et al. | |
| 6,249,288 B1 | 6/2001 | Campbell | |
| 6,278,691 B1 | 8/2001 | Ohyama et al. | |
| 6,298,166 B1 | 10/2001 | Ratnakar et al. | |
| 6,427,058 B1 | 7/2002 | Akiba et al. | |
| 6,438,169 B1 | 8/2002 | Takashima et al. | |
| 6,445,314 B1 * | 9/2002 | Zhang | H03M 7/425 341/65 |
| 6,574,279 B1 | 6/2003 | Vetro et al. | |
| 6,782,368 B2 | 8/2004 | Fujii et al. | |
| 6,823,016 B1 | 11/2004 | Nguyen et al. | |
| 6,963,347 B1 | 11/2005 | Selvaggi et al. | |
| 7,043,088 B2 | 5/2006 | Chiu et al. | |
| 7,072,404 B2 | 7/2006 | Itokawa | |
| 7,085,322 B2 | 8/2006 | Ngai et al. | |
| 7,099,389 B1 | 8/2006 | Yu et al. | |
| 7,116,714 B2 | 10/2006 | Hannuksela | |
| 7,130,526 B2 | 10/2006 | Abelard et al. | |
| 7,289,047 B2 | 10/2007 | Nagori | |
| 7,366,236 B1 | 4/2008 | Winger | |
| 7,370,325 B1 | 5/2008 | Hull et al. | |
| 7,499,960 B2 | 3/2009 | Dageville et al. | |
| 7,573,407 B2 | 8/2009 | Reznik | |
| 7,653,128 B2 | 1/2010 | Shibata et al. | |
| 7,735,087 B2 | 6/2010 | Hayashi | |
| 7,817,723 B2 | 10/2010 | Wiegand et al. | |
| 7,889,788 B2 | 2/2011 | Toma et al. | |
| 8,213,518 B1 | 7/2012 | Wang et al. | |
| 8,291,448 B2 | 10/2012 | Pekonen et al. | |
| 8,396,082 B2 | 3/2013 | Hannuksela et al. | |
| 2002/0036707 A1 | 3/2002 | Gu | |
| 2002/0076115 A1 | 6/2002 | Leeder et al. | |
| 2003/0161405 A1 | 8/2003 | Howard | |
| 2003/0185298 A1 | 10/2003 | Alvarez et al. | |
| 2003/0189982 A1 | 10/2003 | MacInnis | |
| 2003/0210163 A1 * | 11/2003 | Yang | H03M 7/40 341/67 |
| 2003/0235251 A1 | 12/2003 | Hsiun et al. | |
| 2004/0047512 A1 | 3/2004 | Handley et al. | |
| 2004/0117427 A1 | 6/2004 | Allen et al. | |
| 2004/0146109 A1 | 7/2004 | Kondo et al. | |
| 2004/0190617 A1 | 9/2004 | Shen et al. | |
| 2004/0208245 A1 | 10/2004 | MacInnis et al. | |
| 2004/0240743 A1 | 12/2004 | Hamada et al. | |
| 2005/0013362 A1 | 1/2005 | Pearson et al. | |
| 2005/0047666 A1 | 3/2005 | Mitchell et al. | |
| 2005/0053157 A1 | 3/2005 | Lillevold | |
| 2005/0053295 A1 | 3/2005 | Holcomb | |
| 2005/0053300 A1 | 3/2005 | Mukerjee | |
| 2005/0068208 A1 | 3/2005 | Liang et al. | |
| 2005/0123207 A1 | 6/2005 | Marpe et al. | |
| 2005/0169374 A1 | 8/2005 | Marpe et al. | |
| 2005/0175091 A1 | 8/2005 | Puri et al. | |
| 2005/0179568 A1 | 8/2005 | Wee et al. | |
| 2005/0180511 A1 | 8/2005 | Arafune et al. | |
| 2005/0220190 A1 | 10/2005 | Ha et al. | |
| 2005/0289505 A1 | 12/2005 | Williams | |
| 2006/0002479 A1 | 1/2006 | Fernandes | |
| 2006/0013320 A1 | 1/2006 | Oguz | |
| 2006/0056513 A1 | 3/2006 | Shen et al. | |
| 2006/0056517 A1 | 3/2006 | MacInnis et al. | |
| 2006/0056708 A1 | 3/2006 | Shen et al. | |
| 2006/0088286 A1 | 4/2006 | Shibata et al. | |
| 2006/0098734 A1 | 5/2006 | Cho et al. | |
| 2006/0114995 A1 | 6/2006 | Robey et al. | |
| 2006/0126726 A1 | 6/2006 | Lin et al. | |
| 2006/0126744 A1 | 6/2006 | Peng et al. | |
| 2006/0133479 A1 | 6/2006 | Chen et al. | |
| 2006/0133507 A1 | 6/2006 | Lim et al. | |
| 2006/0133770 A1 | 6/2006 | Shibata et al. | |
| 2006/0193383 A1 | 8/2006 | Alvarez et al. | |
| 2006/0204119 A1 | 9/2006 | Feng et al. | |
| 2006/0215754 A1 | 9/2006 | Buxton et al. | |
| 2006/0222254 A1 * | 10/2006 | Zandi | G06F 17/148 382/240 |
| 2006/0227872 A1 | 10/2006 | Mori et al. | |
| 2006/0230162 A1 | 10/2006 | Chen et al. | |
| 2006/0233525 A1 | 10/2006 | Shibata et al. | |
| 2006/0239343 A1 | 10/2006 | Mohsenian | |
| 2006/0245498 A1 | 11/2006 | Lee et al. | |
| 2006/0248516 A1 | 11/2006 | Gordon | |
| 2007/0030911 A1 | 2/2007 | Yoon | |
| 2007/0033494 A1 | 2/2007 | Wenger et al. | |
| 2007/0036223 A1 * | 2/2007 | Srinivasan | H03M 7/46 375/240.18 |
| 2007/0071095 A1 | 3/2007 | Lim | |
| 2007/0120711 A1 | 5/2007 | Hu et al. | |
| 2007/0120867 A1 | 5/2007 | Shastry et al. | |
| 2007/0121728 A1 | 5/2007 | Wang et al. | |
| 2007/0124733 A1 | 5/2007 | Bril et al. | |
| 2007/0126853 A1 | 6/2007 | Ridge et al. | |
| 2007/0160151 A1 | 7/2007 | Bolton et al. | |
| 2007/0177668 A1 | 8/2007 | Park et al. | |
| 2007/0183491 A1 | 8/2007 | Pearson et al. | |
| 2007/0183507 A1 | 8/2007 | Maheshwari et al. | |
| 2007/0201562 A1 | 8/2007 | Ganesh et al. | |
| 2007/0223595 A1 | 9/2007 | Hannuksela et al. | |
| 2007/0230582 A1 | 10/2007 | Chiu et al. | |
| 2007/0233989 A1 | 10/2007 | Garcia-Arellano et al. | |
| 2007/0286276 A1 | 12/2007 | Gartner et al. | |
| 2007/0291857 A1 | 12/2007 | Hussain | |
| 2007/0297501 A1 | 12/2007 | Hussain et al. | |
| 2008/0013620 A1 | 1/2008 | Hannuksela et al. | |
| 2008/0048894 A1 | 2/2008 | Ridge et al. | |
| 2008/0107184 A1 | 5/2008 | Katsavounidis et al. | |
| 2008/0123736 A1 | 5/2008 | Sekiguchi et al. | |
| 2008/0137736 A1 | 6/2008 | Richardson et al. | |
| 2008/0159408 A1 | 7/2008 | Degtyarenko | |
| 2008/0181308 A1 | 7/2008 | Wang et al. | |
| 2008/0187053 A1 | 8/2008 | Zhao et al. | |
| 2008/0285642 A1 | 11/2008 | Jahanghir et al. | |
| 2008/0304520 A1 | 12/2008 | Hannuksela et al. | |
| 2009/0002379 A1 | 1/2009 | Baeza et al. | |
| 2009/0003446 A1 | 1/2009 | Wu et al. | |
| 2009/0003447 A1 * | 1/2009 | Christoffersen | H04N 19/61 375/240.16 |
| 2009/0003451 A1 | 1/2009 | Lin et al. | |
| 2009/0010337 A1 | 1/2009 | Wang | |
| 2009/0010338 A1 | 1/2009 | Wang | |
| 2009/0109988 A1 | 4/2009 | Musunuri et al. | |
| 2009/0122864 A1 | 5/2009 | Palfner et al. | |
| 2009/0147859 A1 | 6/2009 | McGowan et al. | |
| 2009/0175548 A1 | 7/2009 | Fukuhara et al. | |
| 2010/0008418 A1 | 1/2010 | Wu et al. | |
| 2010/0061643 A1 | 3/2010 | Fukuhara et al. | |
| 2010/0158135 A1 | 6/2010 | Yin et al. | |
| 2010/0189182 A1 | 7/2010 | Hannuksela | |
| 2010/0195721 A1 | 8/2010 | Wu et al. | |
| 2011/0206131 A1 * | 8/2011 | Vafin | H03M 7/40 375/240.23 |
| 2011/0295820 A1 | 12/2011 | Volkoff et al. | |
| 2012/0054463 A1 | 3/2012 | Poyarekar | |

FOREIGN PATENT DOCUMENTS

| | | |
|---|---|---|
| CN | 101051465 | 10/2007 |
| CN | 101313585 | 11/2008 |
| CN | 101569170 | 10/2009 |
| EP | 0 909 094 | 4/1999 |

(56) References Cited

FOREIGN PATENT DOCUMENTS

| EP | 1 195 992 | 4/2002 |
|---|---|---|
| WO | WO 2006/096612 | 9/2006 |
| WO | WO 2006/134110 | 12/2006 |

OTHER PUBLICATIONS

Search Report dated Dec. 26, 2013, from Chinese Patent Application No. 201110441018.1, 4 pp.
De Neve et al., "Real-Time BSD-driven Adaptation Along the Temporal Axis of H.264/AVC Bitstreams," *Advances in Multimedia Information Processing*, pp. 131-140 (2006).
MainConcept, "MainConcept™ Showcase 2.8," 4 pp. (downloaded from the World Wide Web on Apr. 6, 2011).
Narasimhan, "Contributions to Carriage of AVC in MPEG-2, " ISO/IEC/JTC1/SC29/WG11, MPEG2003/m9448, 12 pp. (2003).
Schwarz et al., "Overview of the Scalable H.264/MPEG4-AVC Extension," *IEEE Int'l Conf. on Image Processing*, pp. 161-164 (Oct. 2006).
Segall et al., "Spatial Scalability Within the H.264/AVC Scalable Video Coding Extension," *IEEE Trans. on Circuits and Systems for Video Technology*, vol. 17, No. 9, pp. 1121-1135 (Sep. 2007).
Sullivan, "DirectX Video Acceleration Specification for H.264/AVC Decoding," 66 pp. (Dec. 2007—updated Dec. 2010).
Sullivan et al., "DirectX Video Acceleration Specification for H.264/MPEG-4 AVC Multiview Video Coding (MVC), Including the Stereo High Profile," 17 pp. (Mar. 2011).
Wiegand et al., "Introduction to the Special Issue on Scalable Video Coding—Standardization and Beyond," *IEEE Trans. on Circuits and Systems for Video Technology*, vol. 17, No. 9, pp. 1099-1102 (Sep. 2007).
Murata et al., "Fast 2D IDCT Implementation with Multimedia Instructions for a Software MPEG2 Decoder," *Int'l Conf. on Acoustics, Speech, and Signal Processing*, vol. 5, pp. 3105-3108 (May 1998).
Prada-Rojas et al,. "Towards a Component-based Observation of MPSoC," *IEEE*, pp. 542-549 (Sep. 2009).
Yadav et al., "Software-only Multiple Variable Length Decoding for Real-Time Video on MDSP," *Int'l Conf. on Consumer Electronics*, pp. 141-142 (Jan. 2005).
3rd Generation Partnership Project, "Multimedia telephony over IP Multimedia Subsystem (IMS); Optimization opportunities (Release 7)," 3GPP Technical Report TR 26.914 V7.0.0, 18 pp. (Mar. 2006).
Akramullah et al., "Parallelization of MPEG-2 Video Encoder for Parallel and Distributed Computing Systems," *IEEE*, pp. 834-837 (Aug. 1995).
ATI Technologies, Inc., "Introduction to H.264," 6 pp. (month unknown, 2005).
Azevedo et al., "A Highly Scalable Parallel Implementation of H.264," Transactions on High-Performance Embedded Architectures and Compilers, 25 pp. (Sep. 2009).
Chen et al., "Implementation of H.264 Encoder and Decoder on Personal Computers," *Journal of Visual Comm. and Image Representation*, 19 pp. (Apr. 2006).
Chen, "Synchronization and Control of Multi-threads for MPEG-4 Video Decoder," *IEEE 1999 Int'l Conf. on Consumer Electronics*, pp. 298-299 (Jun. 1999).
Dawson, "Coding for Multiple Cores on Xbox 360 and Microsoft Windows," 8 pp. (Aug. 2006) [Downloaded from the Internet on Jan. 22, 2007].
Duffy, "CLR Inside Out: Using Concurrency for Scalability," MSDN Magazine, 11 pp. (Sep. 2006) [Downloaded from the Internet on Jan. 22, 2007].
Foldoc.Org, "priority scheduling," 1 p. (no date) [Downloaded from the Internet on Jan. 26, 2007].
Foldoc.Org, "multitasking," 1 p. (Document dated Apr. 24, 1998) [Downloaded from the Internet on Jan. 26, 2007].
Gerber et al., "Optimizing Video Encoding using Threads and Parallelism: Part 1—Threading a video codec," 3 pp., downloaded from Embedded.com, (Dec. 2009).
Huang et al., "Joint Algorithm/Code-Level Optimization of H.264 Video Decoder for Mobile Multimedia Applications," ICASSP, pp. 2189-2192 (Mar. 2008).
Intel Corp., "Intel's Next Generation Integrated Graphics Architecture—Intel® Graphics Media Accelerator X3000 and 3000," 14 pp. (Jul. 2006).
ISO/IEC, "Text of ISO/IEC 14496-10:2005/FPDAM3 Scalable Video Coding (in Integrated Form with ISO/IEC 14996-10)," ISO/IEC JTC 1/SC 29/WG 11 N8241, 552 pp. (Jul. 2006).
ISO/IEC, "Text of ISO/IEC FCD 29199-2 (JPEG XR image coding—Specification)," ISO/IEC JTC 1/SC 29/WG 11 N4739, 173 pp. (Sep. 2008).
ISO/IEC, "Digital Compression and Coding of Continuous-tone Still Images," ISO DIS 10918-1, CCITT Recommendation T.81, 211 pp. (1992).
ITU, "Advanced video coding for generic audiovisual services," Recommendation ITU-T H.264, 676 pp. (Mar. 2010).
Jacobs et al., "Thread-Parallel MPEG-2, MPEG-4 and H.264 Video Encoders for SoC Multi-Processor Architectures," *IEEE Trans. on Consumer Electronics*, vol. 52, No. 1, pp. 269-275 (Feb. 2006).
Joint Collaborative Team on Video Coding, "Description of video coding technology proposal by Texas Instruments Inc.," JCTVC-A101, 45 pp. (Apr. 2010).
Kim et al., "Multi-thread VLIW processor architecture for HDTV decoding," *IEEE 2000 Custom Integrated Circuits Conf.*, pp. 559-562 (May 2000).
Loomis et al., "VC-1 Technical Overview," 7 pp. (Apr. 2006) [Downloaded from the Internet on Jan. 24, 2007].
Marpe et al., "A Fast Renormalization Technique for H.264/MPEG4-AVC Arithmetic Coding," 14 pp. (2006).
Oehring et al., "MPEG-2 Video Decompression on Simultaneous Multithreaded Multimedia," *Int. Conf. on Parallel Architectures and Compilation Techniques* (*PACT '99*), Newport Beach, CA (Oct. 1999).
Ostermann et al., "Video Coding with H.264/AVC: Tools, Performance, and Complexity," *IEEE Circuits and Systems Magazine*, pp. 7-28 (Aug. 2004).
Richardson, H.264 and MPEG-4 Video Compression: Video Coding for Next-generation Multimedia, Chapter 6, "H.264/MPEG4 Part 10," pp. 159-223 (Aug. 2003).
Sambe et al., "High-speed Distributed Video Transcoding for Multiple Rates and Formats," *IEICE Trans on Information and Systems*, vol. E88-D, Issue 8, pp. 1923-1931 (Aug. 2005).
SMPTE, "Proposed SMPTE Standard for Television: VC-1 Compressed Video Bitstream Format and Decoding Process," SMPTE 421M, pp. i-xx, 5-7, Aug. 23-27, 2005.
SMPTE, "VC-1 Compressed Video Bitstream Format and Decoding Process," SMPTE 421M-2006, 493 pp. (Feb. 2006).
Sullivan et al., "Microsoft DirectX VA: Video Acceleration API/DDI," 88 pp. (2001).
Van Der Tol et al., "Mapping of MPEG-4 decoding on a flexible architecture platform," *Proceedings of the SPIE, Media Processors*, vol. 4674, 13 pp. (Jan. 2002).
Van Der Tol et al., "Mapping of H.264 decoding on a multiprocessor architecture," *Proceedings of the SPIE*, vol. 5022, pp. 707-718 (May 2003).
Wang, "H.264 Baseline Video Implementation on the CT3400 Multi-core DSP," Cradle Technologies, 15 pp. (2006).
Wang, "[Mp4-tech] [H.264] output timing, bumping process, missing HRD parameters," downloaded from World Wide Web, 3 pp. (document marked May 5, 2006).
Wikipedia, "Motion JPEG," 4 pp., downloaded from the World Wide Web on Dec. 29, 2010.
Youssef, "JPEG and MPEG Standards," 14 pp., downloaded from the World Wide Web on Dec. 29, 2010.
Wong et al., "Task Concurrency Management Methodology to Schedule the MPEG4 IM1 Player on a Highly Parallel Processor Platform," Proc. of the Ninth Int'l Symp. on Hardware/Software Codesign, pp. 170-175 (Apr. 2001).
U.S. Appl. No. 11/703,613.

(56) References Cited

OTHER PUBLICATIONS

U.S. Appl. No. 13/848,631.
U.S. Appl. No. 14/266,609.
U.S. Appl. No. 11/824,563.
U.S. Appl. No. 11/824,508.
U.S. Appl. No. 14/100,661.
U.S. Appl. No. 14/100,750.
U.S. Appl. No. 13/929,573.
U.S. Appl. No. 12/966,914.
U.S. Appl. No. 12/978,501.
U.S. Appl. No. 13/223,079.
U.S. Appl. No. 14/256,351.
U.S. Appl. No. 13/329,093.

* cited by examiner software 180 implementing one or more
innovations for decoding implementations

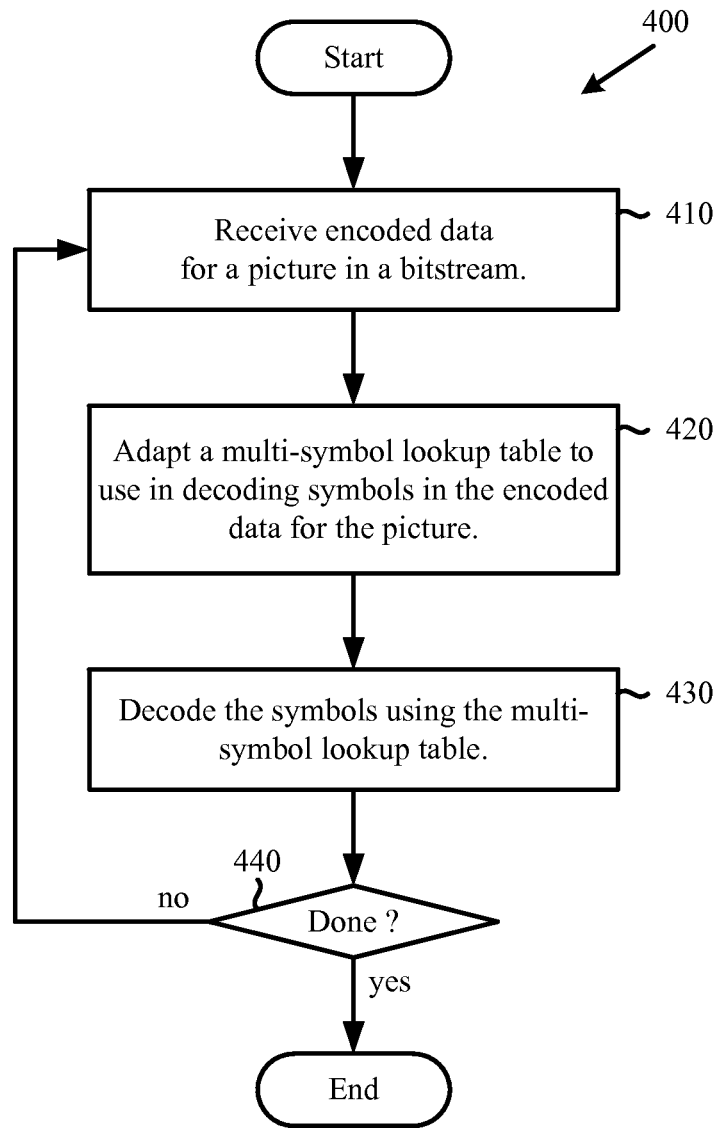

Figure 5

| VLC | Symbol H(d, k) | Code Length |
|---|---|---|
| 000 | H0 (0, 1) | 3 |
| 001 | H1 (1, 1) | 3 |
| 010 | H2 (2, 1) | 3 |
| 011 | H3 (0, 2) | 3 |
| 1000 | H4 (3, 1) | 4 |
| 10010 | H5 (4, 1) | 5 |
| 10011 | H6 (0, 3) | 5 |
| 1010000 | EOB | 7 |
| 1010001 | H8 (5, 1) | 7 |
| 1010010 | H9 (6, 1) | 7 |
| 1010011 | H10 (1, 2) | 7 |
| 1010100 | H11 (0, 4) | 7 |
| 101010100 | H12 (7, 1) | 9 |
| 101010101 | H13 (8, 1) | 9 |
| 101010110 | H14 (1, 3) | 9 |
| 1010101110 | H15 (9, 1) | 10 |
| ... | ... | ... |
| 11111111110110 | Hn (d, k) | 14 |

501

511

| Loaded 8 Bits | VLCs | Symbol Count: Symbols | Consumed Bit Length |
|---|---|---|---|
| 00000000 | 000 0 000 0 | 4: H0 S H0 S | 8 |
| 00000001 | 000 0 000 1 | 4: H0 S H0 S | 8 |
| 00000010 | 000 0 001 0 | 4: H0 S H1 S | 8 |
| 00000011 | 000 0 001 1 | 4: H0 S H1 S | 8 |
| 00000100 | 000 0 010 0 | 4: H0 S H2 S | 8 |
| ... | ... | ... | ... |
| 01100010 | 011 0 0 010 | 4: H3 S M(1) H2 | 8 |
| 01100011 | 011 0 0 011 | 4: H3 S M(1) H3 | 8 |
| 01100100 | 011 0 0 | 3: H3 S M(1) | 5 |
| ... | ... | ... | ... |
| 10010110 | 10010 1 | 2: H5 S | 6 |
| 10010111 | 10010 1 | 2: H5 S | 6 |
| 10011000 | 10011 1 00 | 3: H6 S M(2) | 8 |
| 10011001 | 10011 1 01 | 3: H6 S M(2) | 8 |
| 10011010 | 10011 1 10 | 3: H6 S M(2) | 8 |
| ... | ... | ... | ... |
| 10101000 | 1010100 0 | 2: H11 S | 8 |
| 10101001 | 1010100 1 | 2: H11 S | 8 |
| 10101010 | Partial (H12 or H13) | 0: | 0 |
| 10101011 | Partial (H14...) | 0: | 0 |
| ... | ... | ... | ... |
| 11111111 | Partial | 0: | 0 |

Figure 9

```
Index = 1;
NonZeroIndices = 0;
While (index < 64)
{
    H = HuffDecode(stream);
    Index += Skip(H);
    If (HasCoeff(H))
    {
        Z = ZigZag[Index];
        NonZeroIndices |= Z;
        AC[Z] = CoeffDecode(stream, CoeffSize(H));
    }
    Index++;
}
```
← 901

`NonZeroIndices |= (NonZeroIndices >> 3);`   // overall upper frequency category ← 902
from horizontal max (info is in bits 0-2) and
vertical max (info is in bits 3-5)

IMAGE AND VIDEO DECODING IMPLEMENTATIONS

BACKGROUND

Engineers use compression (also called source coding or source encoding) to reduce the bitrate of digital video. Compression decreases the cost of storing and transmitting video information by converting the information into a lower bitrate form. Decompression (also called decoding) reconstructs a version of the original information from the compressed form. A "codec" is an encoder/decoder system.

Compression can be lossless, in which the quality of the video does not suffer, but decreases in bit rate are limited by the inherent amount of variability (sometimes called source entropy) of the input video data. Or, compression can be lossy, in which the quality of the video suffers, and the lost quality cannot be completely recovered, but achievable decreases in bit rate are more dramatic. Lossy compression is often used in conjunction with lossless compression—lossy compression establishes an approximation of information, and the lossless compression is applied to represent the approximation.

In general, video compression techniques include "intra-picture" compression and "inter-picture" compression. Intra-picture compression techniques compress a picture with reference to information within the picture, and inter-picture compression techniques compress a picture with reference to a preceding and/or following picture (often called a reference or anchor picture) or pictures.

For intra-picture compression, for example, an encoder splits a picture into 8×8 blocks of samples, where a sample is a number that represents the intensity of brightness (or the intensity of a color component) for a small, elementary region of the picture, and the samples of the picture are organized as arrays or planes. The encoder applies a frequency transform to individual blocks. The frequency transform converts a block of samples into a block of transform coefficients. The encoder quantizes the transform coefficients, which may result in lossy compression. For lossless compression, the encoder entropy codes the quantized transform coefficients.

Inter-picture compression techniques often use motion estimation and motion compensation to reduce bit rate by exploiting temporal redundancy in a video sequence. Motion estimation is a process for estimating motion between pictures. For example, for a block of samples or other unit of the current picture, the encoder attempts to find a match of the same size in a search area in another picture, the reference picture. Within the search area, the encoder compares the current unit to various candidates in order to find a candidate that is a good match. When the encoder finds an exact or "close enough" match, the encoder parameterizes the change in position between the current and candidate units as motion data (such as a motion vector). In general, motion compensation is a process of reconstructing pictures from reference pictures using motion data. Typically, the encoder also computes the sample-by-sample difference between the original current unit and its motion-compensated prediction to determine a residual (also called a prediction residual or error signal). The encoder then applies a frequency transform to the residual, resulting in transform coefficients. The encoder quantizes the transform coefficients and entropy codes the quantized transform coefficients.

If an intra-compressed picture or motion-predicted picture is used as a reference picture for subsequent motion compensation, the encoder reconstructs the picture. A decoder also reconstructs pictures during decoding, and it uses some of the reconstructed pictures as reference pictures in motion compensation. For example, for a block of samples of an intra-compressed picture, a decoder reconstructs a block of quantized transform coefficients. The decoder and encoder perform inverse quantization and an inverse frequency transform to produce a reconstructed version of the original block of samples.

Or, for a block encoded using inter-picture prediction, the decoder or encoder reconstructs a block from a prediction residual for the block. The decoder decodes entropy-coded information representing the prediction residual. The decoder/encoder inverse quantizes and inverse frequency transforms the data, resulting in a reconstructed residual. In a separate motion compensation path, the decoder/encoder computes a predicted block using motion vector information for displacement from a reference picture. The decoder/encoder then combines the predicted block with the reconstructed residual to form the reconstructed block.

Over the last two decades, various video codec standards have been adopted, including the H.261, H.262 (MPEG-2) and H.263 standards and the MPEG-1 and MPEG-4 standards. More recently, the H.264 standard (sometimes referred to as 14496-10 or the AVC standard) and VC-1 standard have been adopted. For additional details, see representative versions of the respective standards. A video codec standard typically defines options for the syntax of an encoded video bitstream, detailing parameters in the bitstream for a video sequence when particular features are used in encoding and decoding. In many cases, a video codec standard also provides details about the decoding operations that a decoder should perform to achieve correct results in decoding. Often, however, the low-level implementation details of the operations are not specified, or the decoder is able to vary certain implementation details to improve performance, so long as the correct decoding results are still achieved.

Image and video decoding are computationally intensive. Tasks such as entropy decoding and inverse frequency transforms can require extensive computation, considering how many times the operations are performed during decoding. This computational cost can be problematic in various scenarios, such as decoding of high-quality, high-bit rate video (e.g., compressed high-definition video). In particular, decoding tasks according to more recent standards such as H.264 and VC-1 can be computationally intensive and consume significant memory resources.

SUMMARY

In summary, the detailed description presents techniques and tools for improving efficiency of operations in image or video decoding. Some of the techniques and tools described herein reduce the computational cost of image or video decoding, without hurting the quality of the decoded image or video content. Other techniques and tools described herein help a decoder distribute decoding tasks among available computing resources. With more efficient decoding, an image or video decoder can speed up decoding, use its available computing resources to decode higher bitrate/higher quality content, or use the computing resources it saves for other tasks.

According to one aspect of the techniques and tools described herein, a tool such as an image or video decoder receives encoded data for a picture in a bitstream and decodes the encoded data for the picture. As part of the decoding, the tool adapts a multi-symbol lookup table to use in decoding of symbols in the encoded data for the picture, where each of the symbols is represented in the encoded data with a variable length code (VLC) or fixed length code (FLC). The decoded symbols can represent run-level pair information for transform coefficients, bitplane values, level information for a transform coefficient, run information for transform coefficients, or another type of syntax element in the encoded data. The tool then decodes the symbols using the multi-symbol lookup table. By using the multi-symbol lookup table, the tool reduces the computational cost of image or video decoding while producing the same decoded symbols as regular decoding.

For example, the multi-symbol lookup table has up to $2^x$ entries indexed by possible combinations of x-bit values, respectively. At least one entry of the multi-symbol lookup table associates a series of VLCs leading the x-bit value for that entry with a series of multiple symbols, such that the series of VLCs consumes as many bits as possible from the x-bit value but leaves as undefined any bits of the x-bit value that indicate a partial symbol. In some implementations, for at least one other entry of the multi-symbol lookup table, the other entry represents a partial symbol.

Generally, the multi-symbol lookup table is adapted according to the VLC table used to encode the symbols for a type of data or syntax element per picture, per group of pictures, per sequence or per some other unit of organization. A new VLC table can be provided on a picture-by-picture basis, or one of multiple available VLC tables can be selected using a syntax element in the bitstream or context information tracked during decoding. For example, the tool reconstructs a VLC table for a picture, and then builds the multi-symbol lookup table using the reconstructed VLC table. Or, the tool decodes a syntax element that indicates one of multiple VLC tables and, hence, indicates which of multiple multi-symbol lookup tables to use.

The details of the decoding using the multi-symbol lookup table depend on implementation. Generally, the tool repeatedly: (a) loads x bits of the bitstream from a buffer; (b) searches for the loaded x bits in the multi-symbol lookup table; and (c) if the loaded x bits indicate one or more whole symbols according to one of the entries in the multi-symbol lookup table, determines y bits that represent the indicated one or more whole symbols, and flushes the y bits from the buffer (if y<x then the last x−y bits of the loaded x bits remain in the buffer for the decoding of other symbols). In some implementations, the decoding of the symbols also includes: (d) if the loaded x bits indicate a partial symbol in the multi-symbol lookup table, loading z additional bits of the bitstream from the buffer to determine a whole symbol indicated by w bits of the loaded x+z bits (wherein x<w<=x+z), and flushing the w bits from the buffer.

According to another aspect of the techniques and tools described herein, a tool such as an image or video decoder receives encoded data for a picture in a bitstream and decodes multiple blocks of the picture. For a given block, the tool identifies an upper horizontal frequency and upper vertical frequency among non-zero coefficients for the block. The tool then selects one of multiple available inverse frequency transforms based upon the upper horizontal frequency and upper vertical frequency. (The tool can also select between multiple available de-quantization modes based on the upper vertical frequency, where some de-quantization modes are computationally simpler than others, then apply the selected de-quantization mode to the transform coefficients.) The tool applies the selected transform to at least some of the transform coefficients for the block to reconstruct sample values or prediction residual values for the block. By selectively using simpler inverse frequency transforms (and, optionally, simpler de-quantization modes), the tool reduces the computational cost of image or video decoding depending on the characteristics of the received encoded data, while producing results that still match the results of regular decoding. For example, if the received encoded data is highly compressed and includes zero-value coefficients at high frequencies, the upper horizontal frequency and upper vertical frequency may be identified to be at very low frequencies, defining a 1×1, 1×2, 2×1, 2×2, etc. section of lower frequency coefficients of the block. In this case, up to 90% of the computations of the inverse frequency transform can be avoided without hurting decoding quality. On the other hand, if the received encoded data is almost losslessly compressed and includes non-zero coefficients even at high frequencies, the upper horizontal frequency and upper vertical frequency may be identified to be at very high frequencies, defining a 5×6, 7×7, 8×8 etc. section of the block. In this case, a smaller proportion of the computations (such as 10%) can be avoided without hurting decoding quality.

Generally, the multiple available inverse frequency transforms have different sizes (e.g., 8×8, 4×4, 2×2, 1×1, 1×8, 2×8). For a given size of block (e.g., 8×8), one of the available inverse frequency transforms is a full inverse frequency transform. The full inverse frequency transform has a higher computational complexity than the other available transforms. Correct selection and application of the other available transforms, however, produces exactly bit-wise matching results compared to the full inverse frequency transform.

The details of how the inverse frequency transform is selected depend on implementation. For example, the tool tracks the upper horizontal frequency and upper vertical frequency among non-zero coefficients as part of entropy decoding and scanning of the transform coefficients into a logical two-dimensional arrangement. Such tracking of the upper horizontal and upper vertical frequencies can be accomplished without requiring control flow branches. This provides an efficient way to identify which inverse frequency transform to apply.

According to another aspect of the techniques and tools described herein, a tool such as an image or video decoder receives encoded data for a picture in a bitstream. Using restart markers in the bitstream, the tool organizes multiple blocks of the picture as partitions. The tool decodes at least some of the partitions in parallel on a partition-by-partition basis using multiple processing cores, where different threads are assigned to different partitions that are decoded in parallel. (A corresponding encoder inserts the restart markers at appropriate locations during encoding. The encoder may also make encoding decisions, e.g., to avoid coding dependencies, that are consistent with parallel decoding of the partitions within the picture.) In this way, the tool can distribute decoding tasks for different partitions among available computing resources to more efficiently use those resources and/or reduce the time it takes to decode a picture.

Aside from facilitating parallel decoding, the restart markers can make decoding more efficient in other ways. For example, the tool determines a base amount of bits per partition (for partitions having a regular interval), and uses the base amount of bits to skip scanning of at least some of the encoded data in the bitstream. Or, when entropy decoding transform coefficients for a block at the end of a partition, the tool can simplify the entropy decoding by eliminating one or more branches for conditional checks.

The foregoing and other objects, features, and advantages of the invention will become more apparent from the following detailed description, which proceeds with reference to the accompanying figures.

BRIEF DESCRIPTION OF THE DRAWINGS

FIG. 4 is a flowchart showing an example technique for entropy decoding using a multi-symbol lookup table that adaptively changes.

FIGS. 3 and 5-7 are diagrams showing VLC tables and corresponding multi-symbol lookup tables in example implementations.

FIG. 9 provides pseudocode listings that show an example technique for determining an overall defining frequency for non-zero coefficients of a block.

DETAILED DESCRIPTION

Figure 1:
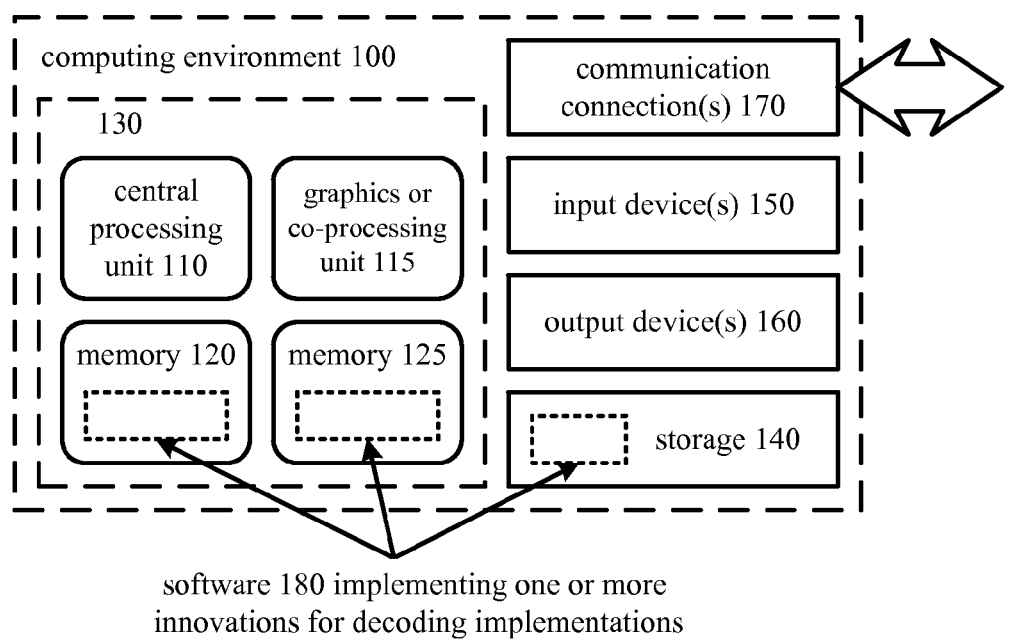
FIG. 1 is a diagram of an example computing environment in which some described embodiments can be implemented.

The detailed description presents techniques and tools for improving the efficiency of image or video decoding. The techniques and tools can help improve decoding efficiency so as to speed up decoding or more effectively use available computing resources.

In image and video decoding, certain operations have a high computationally cost due to the frequency with which the operations are performed. With techniques and tools described herein, decoding efficiency is improved by reducing the computational costs associated with common decoding operations and/or by efficiently distributing decoding tasks to available computing resources. For example, decoding is improved by using one or more of the following:

Entropy decoding with multi-symbol lookup tables. Entropy decoding operations may be simple when considered in isolation for a few symbols. Generally, bits of encoded data are loaded from a buffer, a symbol is decoded from the loaded bits using a VLC table lookup operation or arithmetic decoding operation, and the bits that represent the symbol are flushed from the buffer. When performed thousands of times per picture, however, the entropy decoding operations have a high overall cost. In many scenarios, entropy decoding consumes 40-50% of the total decoding cycles. To make decoding less computationally intensive, instead of using a regular VLC table, a decoder can use a multi-symbol lookup table constructed to reflect VLCs and their lengths from the regular VLC table. In many cases, the decoder can decode multiple symbols using one load operation, one lookup operation in the multi-symbol lookup table, and one flush operation. This can significantly reduce the computational cost of entropy decoding—cutting decoding time by more than 30% in some implementations—while producing results that exactly match the results of regular entropy decoding. To achieve compression, a regular VLC table is designed such that more probable symbols are encoded using shorter length VLCs, and less probable symbols are encoded using longer length VLCs. Statistically, the most probable symbols are expected to occur with very high probability, which means the shortest VLCs are expected to occur in the bitstream with very high probability. Thus, when loading a certain number of bits (for example, 8, 10 or 12 bits) during entropy decoding, the probability that the loaded bits contain VLCs for multiple symbols can be very high, which results in the 30% improvement in entropy decoding performance by using multi-symbol lookup tables in some cases.

Selectively truncated inverse frequency transforms. Inverse frequency transforms are another computationally intensive task. An inverse frequency transform can be complex even for a single block, since it typically involves multiple rounds of computations for 16, 64, or more values per block. And when performed hundreds of times per picture, inverse frequency transforms have a high overall computational cost. In regular decoding, this may be the case even when many of the transform coefficients have values of zero. To reduce the computational cost of performing inverse frequency transforms, a decoder can take advantage of the relative rareness of non-zero transform coefficients by selectively removing or simplifying operations of the inverse frequency transform that would only involve zero-value coefficients. Such truncated inverse frequency transforms have a lower computational cost while producing results that exactly match results from a full inverse frequency transform. The decoder can also selectively simplify de-quantization operations that are performed before performing the inverse frequency transform, limiting the de-quantization operations to those that affect non-zero coefficients, and thereby further reducing the computational cost of decoding.

Partitions indicated with restart markers. In some decoding scenarios, a computing device has resources that the device is unable to use for decoding due to bottlenecks in decoding. For example, encoded data can be available in a buffer but not currently decodable because the encoded data may rely on surrounding content that has not yet been decoded. To address this situation, a decoder can use syntax elements in a bitstream to identify partitions of blocks within a picture, where the partitions can be decoded in parallel. In this way, the decoder can more efficiently use available computing resources and, in some cases, reduce decoding latency by completing decoding faster.

Some of the innovations described herein (e.g., entropy decoding with multi-symbol lookup tables, selectively truncated inverse frequency transforms) need no cooperation from an encoder or other processing tool prior to decoding—the innovations are implemented in a decoder such that by itself the decoder adapts to a given bitstream. For other innovations described herein (e.g., partitions indicated with restart markers), an encoder inserts syntax elements in the bitstream to facilitate efficient decoding. Alternatively, another processing tool could insert such syntax elements.

Generally, innovations presented herein are described independent of standard-specific details. For example, selective truncation of inverse frequency transforms and entropy decoding with a multi-symbol lookup table are described in standard-independent ways. Some example implementations described herein, however, are illustrated with reference to syntax elements and operations specific to the JPEG standard, MJPEG standard, VC-1 standard, or JPEG XR standard. For example, implementations of entropy decoding with a multi-symbol lookup table are detailed for transform coefficients in the JPEG, MJPEG and JPEG XR standards, and for bitplane coding in the VC-1 standard. Examples of partitioning using restart markers are described for the MJPEG standard. Such innovations can also be implemented for other standards or formats.

Many of the examples described herein relate to image or video content. Alternatively, a decoder can implement one or more of the innovations to decode audio content or other media content. More generally, various alternatives to the examples described herein are possible. Certain techniques described with reference to flowchart diagrams can be altered by changing the ordering of stages shown in the flowcharts, by splitting, repeating or omitting certain stages, etc. The various aspects of the decoding innovations described herein can be used in combination or separately. Different embodiments use one or more of the described techniques and tools. Some of the techniques and tools described herein address one or more of the problems noted in the background. Typically, a given technique/tool does not solve all such problems.

I. Example Computing Environments

FIG. 1 illustrates a generalized example of a suitable computing environment (100) in which several of the described techniques and tools may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit (110) as well as a graphics processing unit or co-processing unit (115). The memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for decoding, in the form of computer-executable instructions suitable for execution by the processing unit(s).

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing environment (100). The storage (140) stores instructions for the software (180) implementing one or more innovations for decoding.

The input device(s) (150) may be a touch input device such as a keyboard, mouse, pen, or trackball, a voice input device, a scanning device, or another device that provides input to the computing environment (100). For image or video encoding, the input device(s) (150) may be a video card, TV tuner card, camera or similar device that accepts video input in analog or digital form, or a CD-ROM or CD-RW that reads samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless media implemented with an electrical, optical, RF, or other carrier.

The techniques and tools can be described in the general context of computer-readable media. Computer-readable media are any available tangible media that can be accessed within a computing environment. By way of example, and not limitation, with the computing environment (100), computer-readable media include memory (120), storage (140), and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "select" to describe computer operations in a computing environment. These terms are high-level abstractions for operations performed by a computer, and should not be confused with acts performed by a human being. The actual computer operations corresponding to these terms vary depending on implementation.

II. Example Decoders

Figure 2:
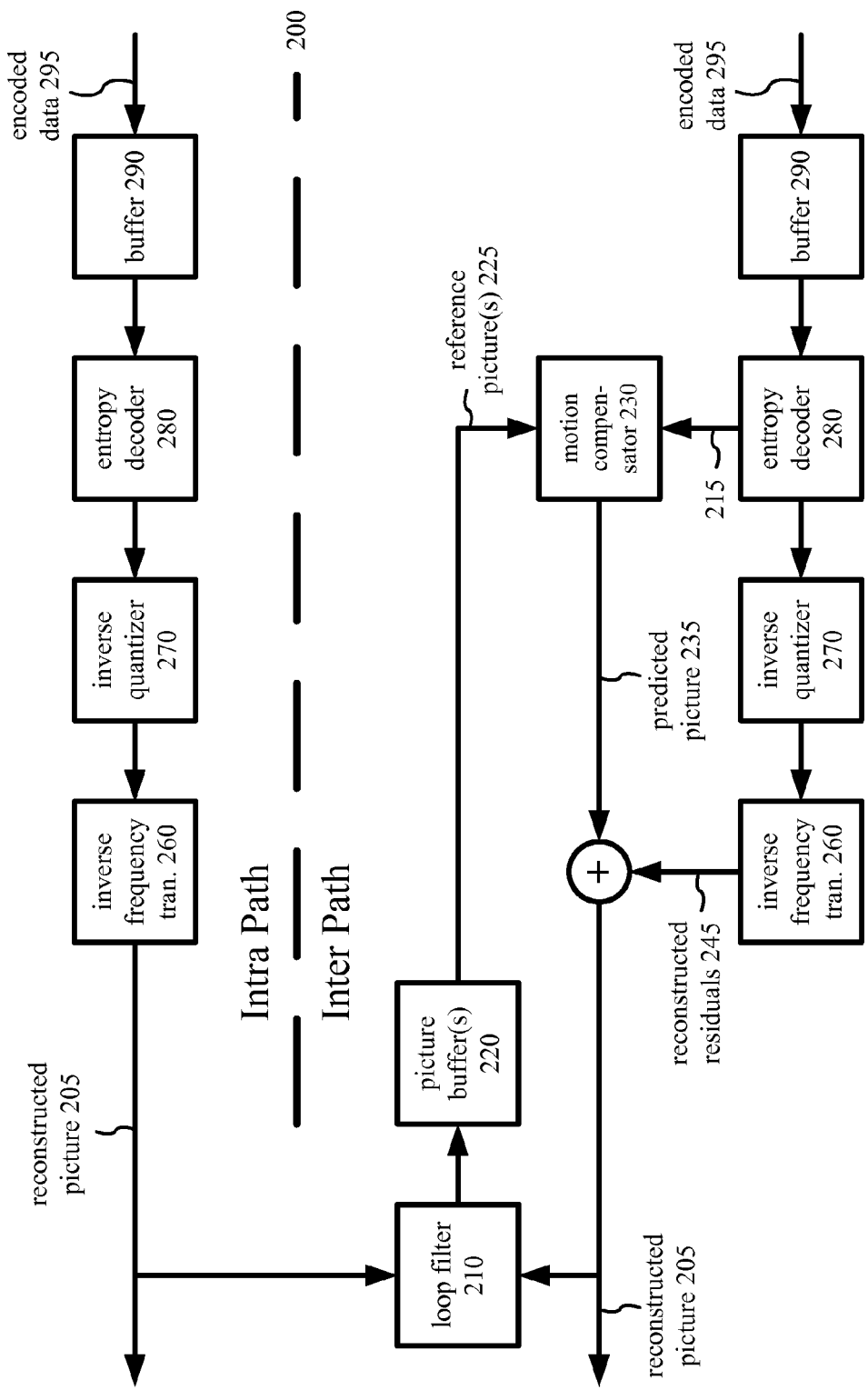
FIG. 2 is a diagram of an example decoder in conjunction with which some described embodiments can be implemented.

FIG. 2 is a block diagram of a generalized decoder (200) in conjunction with which several described embodiments may be implemented. The decoder (200) receives encoded data (295) for a compressed picture or sequence of pictures and produces output including a reconstructed picture (205). The decoder (200) processes one or more pictures, which may be frames, video fields or combinations of frames and fields. For the sake of presentation, FIG. 2 shows an "intra path" for key pictures through the decoder (200) and an "inter path" for predicted pictures. For video decoding, the decoder (200) decompresses predicted pictures and key pictures. For image decoding, the decoder includes components of the intra path. Many of the components of the decoder (200) are used for decompressing both key pictures and predicted pictures. The exact operations performed by those components can vary depending on the type of information being decompressed.

A buffer (290) receives encoded data (295) for a compressed picture and makes the received encoded data available to the entropy decoder (280). The entropy decoder (280) entropy decodes entropy-coded quantized data as well as entropy-coded side information, typically applying the inverse of entropy encoding performed in the encoder. Section III details examples of entropy decoding using multi-symbol lookup tables.

A motion compensator (230) applies motion information (215) to one or more reference pictures (225) to form motion-compensated predictions (235) of sub-blocks, blocks and/or macroblocks (generally, blocks) of the picture (205) being reconstructed. One or more picture stores store previously reconstructed pictures for use as reference pictures. The intra path can include an intra prediction module (not shown) that spatially predicts sample values of a current block from neighboring, previously reconstructed sample values.

The decoder (200) also reconstructs prediction residuals. An inverse quantizer (270) inverse quantizes entropy-decoded data. An inverse frequency transformer (260) converts the quantized, frequency domain data into spatial domain information. For example, the inverse frequency transformer (260) applies an inverse block transform to blocks of the frequency transform coefficients, producing sample data or prediction residual data. The inverse frequency transform can be an inverse discrete cosine transform (DCT), an integer approximation thereof, or another type of inverse frequency transform. Section IV describes examples of selectively truncated inverse frequency transforms.

For a predicted picture, the decoder (200) combines reconstructed prediction residuals (245) with motion compensated predictions (235) to form the reconstructed picture (205). (Although not shown in FIG. 2, in the intra path, the decoder (200) can combine prediction residuals with spatial predictions from intra prediction.) A motion compensation loop in the video decoder (200) includes an adaptive de-blocking filter (223). The decoder (200) applies in-loop filtering (223) to the reconstructed picture to adaptively smooth discontinuities across block boundary rows and/or columns in the picture. The decoder stores the reconstructed picture in a picture buffer (220) for use as a possible reference picture.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (200). The relationships shown between modules within the decoder (200) indicate general flows of information in the decoder; other relationships are not shown for the sake of simplicity.

III. Variable Length Decoding Using a Multi-symbol Lookup Table

To variable length decode a symbol, a decoder loads bits of encoded data from a buffer, searches for the symbol within the loaded bits using a VLC table lookup operation, and flushes the bits that represent the symbol from the buffer. While this can be relatively simple for a single symbol, when performed thousands of times per picture, entropy decoding operations have a high overall cost.

A regular VLC table is constructed such that the lengths of VLCs in the table vary, at least roughly, inversely with the expected probability of occurrence of the symbols the respective VLCs represent. More probable symbols (according to the expected probability distribution) have VLCs with shorter lengths, and less probable symbols have VLCs with longer lengths.

Instead of using a regular VLC table, a decoder can use a multi-symbol lookup table that has been constructed to reflect VLCs and their lengths from the VLC table. With the multi-symbol lookup table, in many cases, the decoder can decode several symbols using one operation loading x bits, one lookup operation in the multi-symbol lookup table to find the symbols within the loaded x bits, and one flush operation. This can significantly reduce the computational cost of entropy decoding and thereby increase throughput of entropy decoding.

Figure 3:
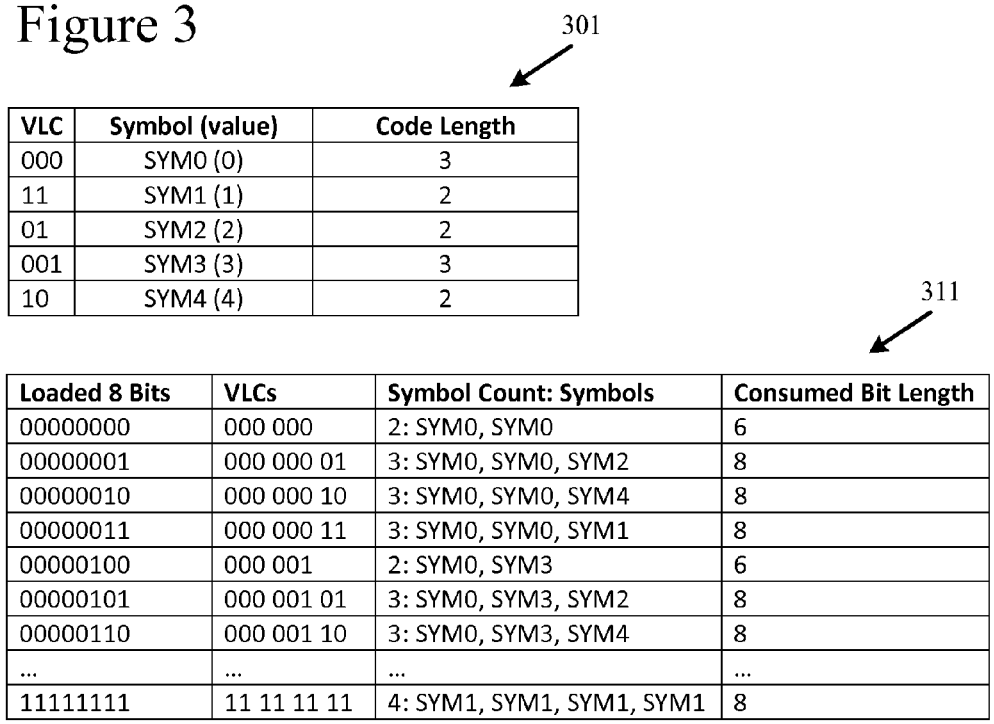

FIG. 3 shows an example VLC table (301) with five VLCs. A given entry of the VLC table (301) associates a VLC with a symbol. For example, the VLC 11 has a VLC length of 2 and is associated with the symbol SYM1, which represents a value of 1. The lengths of the VLCs—3, 2, 2, 3, and 2—roughly correspond in an inverse way to the expected probability distribution for the symbols.

FIG. 3 also shows a multi-symbol lookup table (311) that has been constructed using the VLCs from the VLC table (301). An entry of the multi-symbol lookup table (311) associates 8 loaded bits with one or more symbols within the loaded 8 bits and a number of bits consumed by those one or more symbols. The first entry of the table (311) associates the 8-bit value 00000000 with the two symbols SYM0, SYM0 and a consumed bit length of 6—three bits for each occurrence of SYM0. (For the sake of illustration, the table (311) and other multi-symbol lookup tables illustrated herein also show the VLCs for the represented symbols and a symbol count, but such information need not be part of the actual table implementation.) For the first entry, the last two bits of the loaded 8 bits are undefined, since they represent only part of a symbol in the bitstream. The second entry of the table (311) associates the 8-bit value 00000001 with the three symbols SYM0, SYM0, SYM2 and a consumed bit length of 8. The table (311) continues until the last entry, which associates the 8-bit value 11111111 with the four symbols SYM1, SYM1, SYM1, SYM1 and a consumed bit length of 8.

When decoding a series of symbols from the VLC table (301), a decoder loads 8 bits from the buffer, looks up the 8 bits in the lookup-table (311) to find the symbols represented within the loaded bits, determines how many bits are consumed by the symbols, and flushes the consumed bits from the buffer. The decoder continues decoding by loading the next 8 bits from the buffer. In this way, the decoder can decode several symbols using one load operation, one lookup operation, and one flush operation.

Subject to the rules by which a bitstream is organized, and subject to the types of symbols represented in the table, each entry in a multi-symbol lookup table includes as many symbols as possible within the x-bit value for the entry. The symbols in the VLC table (301) represent different values for the same type of syntax element, and the bitstream can include three or more of the symbols in a series, so an entry in the multi-symbol lookup table can include two, three or four of the symbols in any order. In some implementations, the multi-symbol lookup table is used to decode a series of different types of syntax elements, and an entry in the lookup table can include multiple symbols for the different types of syntax elements. For example, a bitstream can contain VLCs for symbols of one syntax element that are mixed with (a) other (possibly optional) VLCs for symbols of a different syntax element (b) FLCs for other symbols, and/or (c) other, non-compressed information. A multi-symbol lookup table can be used to decode with a single lookup operation all whole symbols (even for different syntax elements, etc.) that are contained in the loaded x-bit value, with the decoder state being modified accordingly.

Each entry in the lookup table (311) includes multiple whole symbols, since all of the VLCs in the VLC table (301) are relatively short. Some of the entries in the lookup table (311) also include a partial symbol. In many implementations, VLCs are longer, and an entry in the lookup table may include a single whole symbol, or no whole symbols at all. When the loaded x bits contain no whole symbol, the bits for the partial symbol are not flushed from the buffer. Rather, the decoder falls back to regular decoding of the symbol by loading additional bits from the buffer. When the loaded x bits contain a whole symbol but also contain a partial symbol, the decoder flushes the bits that were consumed for whole symbols, and loads x more bits that now begin with the bits that indicated the partial symbol.

In general, a multi-symbol lookup table has up to $2^x$ entries indexed by possible permutations for the loaded x bits. At least one entry of the multi-symbol lookup table associates a series of VLCs leading the x-bit value for that entry with a series of multiple symbols, such that the series of VLCs consumes as many bits as possible from the x-bit value but leaves as undefined any bits of the x-bit value that indicate a partial symbol. When VLCs can be longer than x bits, at least one other entry of the multi-symbol lookup table typically indicates the x-bit value for that other entry represents a partial symbol.

In FIG. 3, x is 8, and the table (311) has $2^8$ entries. Alternatively, x is 10, 12 or some other number. The number of bits x can depend on the cache size used in entropy decoding. For example, if the number of possible combinations of multiple symbols in a series is higher than $2^x$, the cache size may limit lookup operations to x bits at a time. The number of bits x can also depend on the number of entries in the lookup table. For example, if the number of possible combinations of multiple symbols in a series is less than or equal to $2^x$, only $2^x$ entries are needed.

Statistically, when x is 8, 10, 12 or 14, for most VLC tables, the corresponding lookup table includes many entries with multiple symbols, and such entries are frequently used in decoding, which speeds up decoding. If an entry in the lookup table includes a single whole symbol, performance is comparable to regular entropy decoding. Even if an entry in the lookup table includes only a partial symbol, the performance penalty is minor since the decoder simply reverts to a fallback variable length decoding process for the symbol, which is also comparable to regular entropy decoding.

This section describes implementations of multi-symbol lookup tables for variable length decoding of run-level information for transform coefficients according to the JPEG standard or MJPEG standard, bitplane-coded values according to the VC-1 standard and run information and level information for transform coefficients according to JPEG XR standard. Alternatively, a multi-symbol lookup table is used for variable length decoding of another type of information consistent with one of these standards (e.g., decoding of transform coefficient information consistent with the VC-1 standard). Or, a multi-symbol lookup table is used for variable length decoding of another type of information consistent with another standard (e.g., decoding of transform coefficient information encoded with context-adaptive VLCs consistent with the H.264 standard). Generally, multi-symbol lookup tables can be used in Huffman decoding and other forms of variable length decoding with no context switches or relatively infrequent context switches, such that the VLC for one symbol does not have serial dependency on the previously decoded symbol or symbols.

A. Example Technique for Decoding with a Multi-Symbol Lookup Table.

FIG. 4 shows an example technique (400) for performing variable length decoding using a multi-symbol lookup table. A computing device that implements an image or video decoder, such as the decoder (200) shown in FIG. 2, or other tool can perform the technique (400).

The tool receives (410) receives encoded data for a picture in a bitstream and decodes the encoded data for the picture. As part of the decoding, the tool adapts (420) a multi-symbol lookup table to use in decoding some of the symbols in the encoded data for the picture. Generally, the way the tool adapts the multi-symbol lookup table depends on implementation. For example, a new VLC table can be provided on a picture-by-picture basis, in which case the multi-symbol lookup table also changes on a picture-by-picture basis. Or, one of multiple available VLC tables is selected using a syntax element in the bitstream or context information tracked during decoding, and a corresponding multi-symbol lookup table is also selected. Various mechanisms for adapting a multi-symbol lookup table are described below.

The tool then decodes (430) symbols in the encoded data using the multi-symbol lookup table. The symbols to be decoded using the multi-symbol lookup table can include VLCs and FLCs. For example, as part of the decoding (430), the tool repeatedly loads x bits of the bitstream from a buffer and searches for the loaded x bits in the multi-symbol lookup table. If the loaded x bits indicate one or more whole symbols according to one of the entries in the multi-symbol lookup table, the tool determines y bits that represent the one or more whole symbols indicated by the loaded x bits and flushes the y bits from the buffer. If y<x then the last x−y bits of the loaded x bits remain in the buffer. In some implementations, the loaded x bits can indicate a partial symbol in the multi-symbol lookup table. If so, as part of the decoding the symbols using the multi-symbol lookup table, the tool loads z additional bits of the bitstream from the buffer to determine a whole symbol indicated by w bits of the loaded x+z bits (where x<w<=x+z) and flushes the w bits from the buffer. Various ways of performing decoding using a multi-symbol lookup table are described below. To decode symbols using a lookup table, the symbols can be determined with lookup operations in the multi-symbol lookup table then output to other modules of a decoder. Alternatively, to decode symbols using a lookup table, if syntax or semantics prescribes a transformation of a decoded symbol before the symbol is used, the lookup table can directly contain the transformed value to further reduce the amount of processing.

The tool checks (440) whether to continue with the next picture or finish. For the sake of presentation, FIG. 4 shows repetition of the technique (400) on a picture-by-picture basis. Alternatively, the technique is repeated on some other basis. For the sake of simplicity, FIG. 4 does not show the ways that variable length decoding with a multi-symbol lookup table can be integrated with other innovations described herein.

B. Example Implementations—Decoding Run-Level Pair Information.

According to the JPEG standard and MJPEG standard, sample values for a block are converted to transform coefficients using a frequency transform. The transform coefficients for a block include a DC coefficient and AC coefficients. The AC coefficients are encoded as run-level pairs, where a run-level pair is: (a) a run d of zero-value coefficients since the DC coefficient or previous non-zero AC coefficient, and (b) a non-zero coefficient value l. A non-zero coefficient value l has a magnitude of 1 to 1023 (1 to $2^{10}-1$). A given non-zero coefficient value l can be represented with a sign bit s (0 for negative, 1 for positive), a level category value k (for the range $2^{k-1}<=l<=2^k-1$ that includes l), and offset value t (where $l=2^{k-1}+t$). The value k has a range of 1 to 10, and the value t can be represented with k−1 bits. For an 8×8 block with 63 AC coefficients, the value d has a range of 1 to 63. In the encoded data for a picture, the values d, k, s and t for a run-level pair are represented as symbols H, S and M, where H is a Huffman code for (d, k), and M is k−1 extra bits indicating the offset value t. For additional details about syntax elements and decoding of transform coefficients according to the JPEG standard or MJPEG standard, see documentation for the standard.

To decode a picture, a decoder reconstructs a VLC table that will be used for variable length decoding of encoded data for AC coefficients. The decoder can change the VLC table on a picture-by-picture basis or on some other basis (e.g., clip-by-clip basis). The VLC table includes VLCs for (d, k) pair values. The VLC table also includes a VLC for an end of block (EOB) symbol, which indicates the end of non-zero coefficients in a block. Each VLC is at most 16 bits long. FIG. 5 shows an example VLC table (501) with VLCs for (d, k) pair values.

A multi-symbol lookup table is adapted by building the lookup table using the VLC table (501) generated for the picture. FIG. 5 shows the multi-symbol lookup table (511). The multi-symbol lookup table has 256 entries. For some entries, an 8-bit index value for the entry is associated with a symbol H(d, k), a sign value S for non-zero coefficient and k−1 bits for t (shown as M(k−1)). For other entries, the 8-bit index value for the entry is associated with symbols for two run-level pairs—H(d, k), S, H(d, k), S—where the first run-level pair has no bits signaled for M(k−1) because k is 1. For still other entries, the 8-bit index value for the entry is associated with a symbol H(d, k) and a sign value S for non-zero coefficient, but the next symbol is only partially indicated. For longer VLCs that start with a 8-bit index value, the 8-bit index value for the entry indicates a partial symbol.

To decode AC transform coefficients for a given block using the multi-symbol lookup table (511) shown in FIG. 5, a decoder loads x bits of the bitstream from a buffer and searches for the loaded x bits in the multi-symbol lookup table. If the loaded x bits indicate one or more whole symbols for one or more of the run-level pairs, the decoder determines y bits that represent the one or more whole symbols indicated by the loaded x bits, and flushes the y bits from the buffer. On the other hand, if the one or more whole symbols indicated by the loaded x bits only partially indicate a given one of the run-level pairs (e.g., indicating H(d, k) but not S or M(k−1), or indicating H(d, k) and S but not M(k−1)), the decoder loads z additional bits of the bitstream from the buffer to determine any remaining symbols for the given run-level pair, then flushes the z bits from the buffer. Otherwise (the loaded x bits only indicating a partial symbol), the decoder loads z additional bits of the bitstream from the buffer to determine a run-level pair symbol H(d, k), a sign value symbol S, and, depending on the run-level pair symbol, an offset value symbol M(k−1), then flushes w bits from the buffer. (The run-level pair symbol, sign value symbol and, if present, offset value symbol consume w bits of the loaded x+z bits, where x<w<=x+z.)

In many JPEG and MJPEG decoding scenarios, AC coefficient decoding is the most computationally intensive part of entropy decoding. Much of the computational effort is spent decoding the most common VLCs. Since a VLC table is constructed such that symbols expected to be most probable have the shortest lengths, the combined length of H(d, k), S, and M(k−1) is also expected to be relatively short. In one example MJPEG clip, for about 95% of the run-level pair values decoded, the combined length of H(d, k), S, and M(k−1) is 8 bits or less. With a 256-entry multi-symbol lookup table, such H(d, k), S, and M(k−1) symbols for a run-level pair can be decoded with a single lookup operation. When the combined length for H(d, k), S, and M(k−1) symbols is more than 8 bits, but the H(d, k) is 8 bits or less, only the H(d, k) symbol is in the look up table, and the remaining symbol(s) are extracted from the bitstream by falling back to the normal, one symbol at a time decoding process. When even H(d, k) is larger than 8 bits, the H(d, k), S, and M(k−1) symbols are decoded using the normal decoding process. Using the normal decoding process is less efficient, but the normal decoding process is used relatively infrequently.

For about 97% of the run-level pair values decoded, the length of H(d, k), S, and M(k−1) is 10 bits or less. Using a 1024-entry multi-symbol lookup table can further improve decoding speed, but the table is roughly four times larger. Although the performance benefit of using multi-symbol lookup tables depends on the VLC table used and actual symbol distribution, in most cases a 256-entry or 1024-entry multi-symbol lookup table yields H(d, k), S, and M(k−1) symbols with a single lookup operation. This reduces time spent in entropy decoding by 31% and reduces total processor usage by 12%-13% for decoding of a typical MJPEG clip, on average. In general, bigger lookup tables result in decoding of multiple AC coefficients per lookup operation in more cases.

C. Example Implementations—Bitplane Decoding.

According to the VC-1 standard, bits that indicate status information for the macroblocks of a picture can be coded together at picture level as a bitplane. For example, a given bit represents a binary indication of whether a corresponding macroblock is (a) skipped or not skipped, (b) coded using one motion vector or four motion vectors, (c) frame coded or field coded, or (d) some other binary decision. At picture level, the bits of the bitplane can be coded in any of multiple modes, which include a row skip mode, a column skip mode, a "normal-6" coding mode for 2×3 sections of bits, a "normal-2" coding mode for 2×1 sections of bits, and three other modes. For additional details about bitplane syntax elements and bitplane decoding according to the VC-1 standard, see documentation for the standard.

Figure 6:
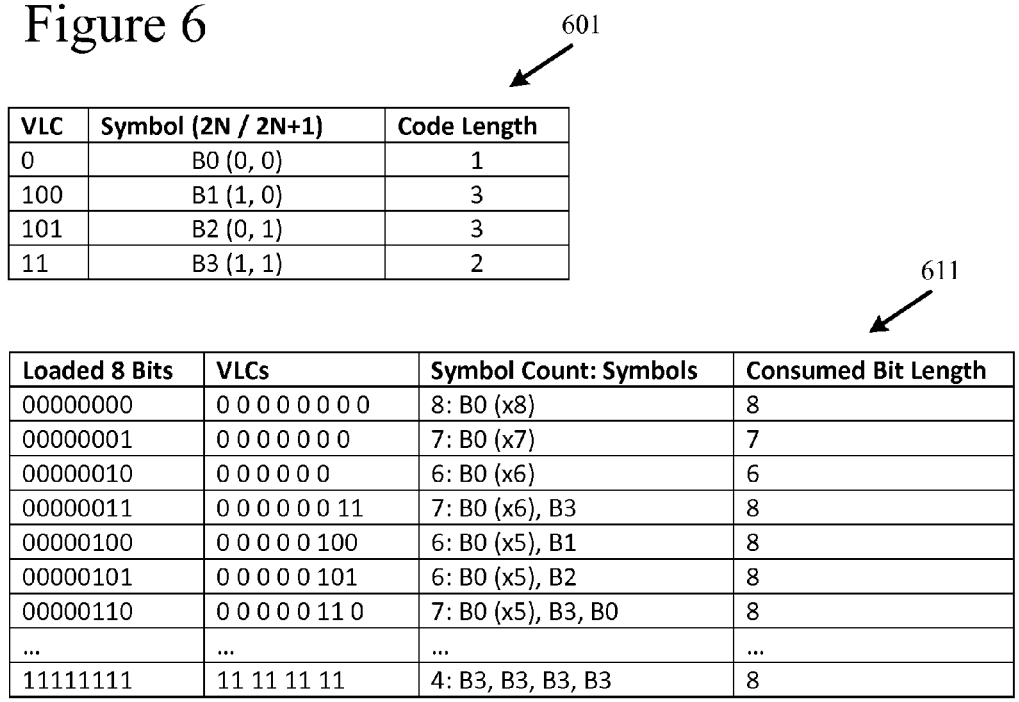

To decode a bitplane, a decoder selects a VLC table to use depending on the bitplane coding mode, which is indicated with a syntax element in the bitstream for the bitplane. The symbols represented in the VLC table depend on the bitplane coding mode, and generally correspond to different possible combinations of bits according to the bitplane coding mode. Each symbol represents one or more bits of a bitplane for the picture. Different bitplanes can be signaled for different syntax elements in encoded data for picture. FIG. 6 shows a VLC table (601) used for the normal-2 coding mode in the VC-1 standard. Each VLC in the VLC table (601) is associated with a pair of bits B(2n, 2n+1) in the bitplane. Other bitplane coding modes use different VLC tables.

In some decoding scenarios, regular decoding of bitplanes consumes a large percentage of the processing cycles when a CPU performs the decoding. Generally, to decode a bitplane according to regular decoding, the decoder selects the appropriate VLC table for the bitplane coding mode, then repeatedly decodes symbols from the VLC table until all of the bits of the bitplane have been decoded.

To speed up decoding, a multi-symbol lookup table can be used. The multi-symbol decoding table is adapted by selecting a multi-symbol lookup table from among multiple available multi-symbol lookup tables, where each of the available lookup tables is adapted for a different bitplane coding mode. To decode symbols for bits of the bitplane, the decoder loads x bits of the bitstream from a buffer and searches for the loaded x bits in the multi-symbol lookup table. The decoder determines y bits that represent one or more symbols indicated by the loaded x bits, and the decoder flushes the y bits from the buffer.

In FIG. 6, the multi-symbol lookup table (611) is adapted to the VLC table (601) for the normal-2 mode. The lookup table (611) has 256 entries. A decoder loads 8 bits from the buffer, searches for the 8-bit index value in the lookup table (611) to decode the indicated symbols, and flushed the consumed bits from the buffer. In some cases, towards the end of the bitplane, fewer than 8 bits may be loaded from the buffer, in which case the regular VLC table (601) can be used for the remaining symbols of the bitplane. In this way, use of the multi-symbol lookup table can significantly speed up bitplane decoding.

D. Example Implementations—Decoding Run or Level Information.

According to the JPEG XR standard, AC transform coefficients are coded with run value information (for runs of zero-value coefficients) and level value information (for non-zero coefficients). The level value for a non-zero coefficient is decoded with the routine DECODE_ABS_LEVEL( ), and a run value for a run of zero-value coefficients is decoded with the routine DECODE_RUN( ). For details about syntax elements and decoding of run values and level values according to the JPEG XR standard, see documentation for the standard.

Figure 7:
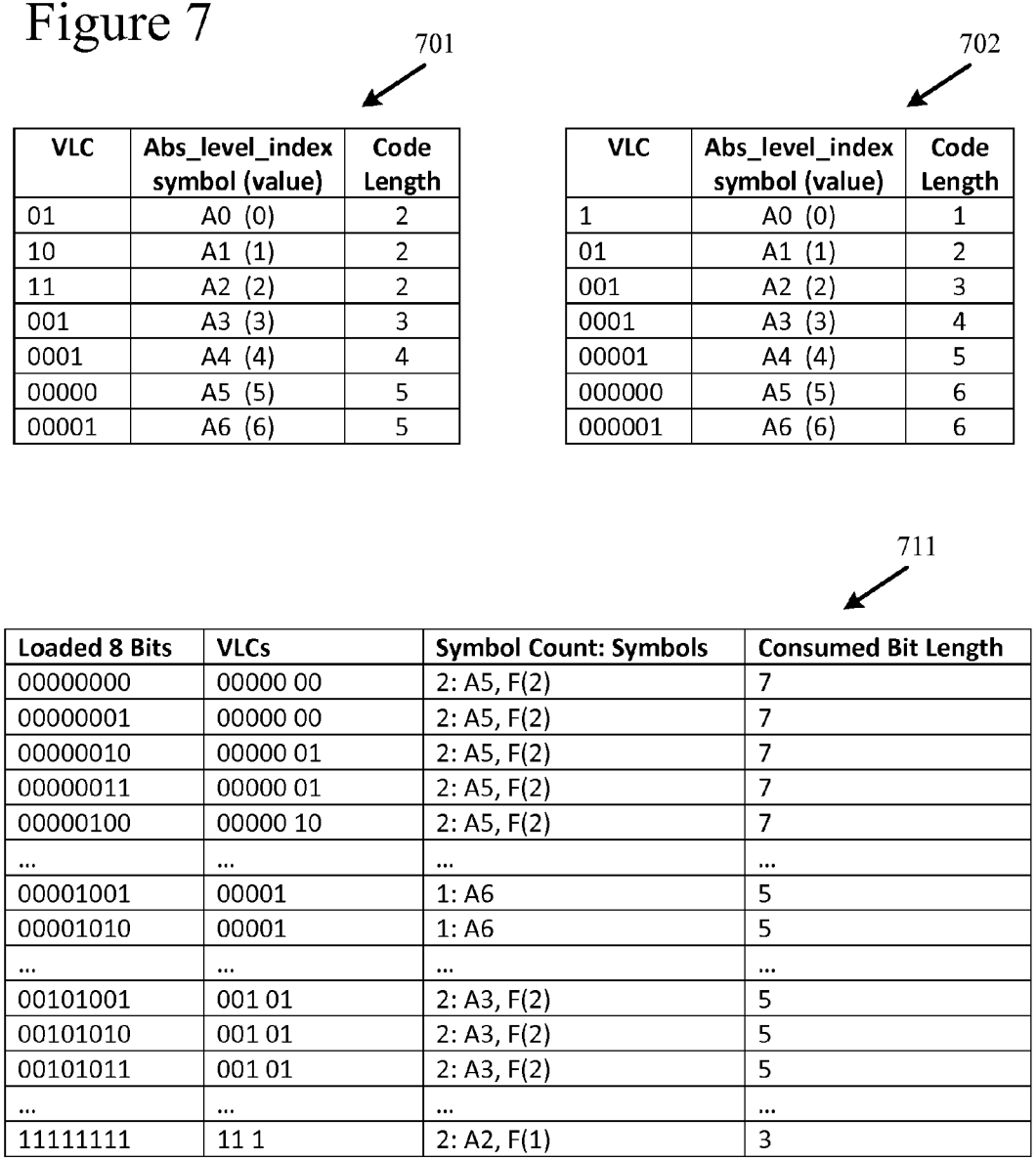

FIG. 7 shows two possible VLC tables (701, 702) for level value information for non-zero AC coefficients according to the JPEG XR standard. Each table (701, 702) includes VLCs for symbols A representing values for an ABSOLUTE_LEVEL_INDEX syntax element. The two tables (701, 702) assign different VLCs to the symbols A to reflect different expected probability distributions for the values of ABSOLUTE_LEVEL_INDEX. Decoding a given non-zero coefficient value may also use iLevel bits in the bitstream. The iLevel bits can be 0, 1 or 2 bits, depending on the value of ABSOLUTE_LEVEL_INDEX. The number of iLevel bits is 0, 0, 1, 2, 2, or 2 for values A0 to A5, respectively. The value A6 for ABSOLUTE_LEVEL_INDEX indicates an escape coding mode in which bits for the non-zero value are signaled with even more additional bits.

FIG. 7 also shows a multi-symbol lookup table (711) for the first VLC table (701). Each row associates an 8-bit index value with a symbol A for ABSOLUTE_LEVEL_INDEX and, in some cases, a symbol F(x) for 1 or 2 extra bits for iLevel. By adapting the routine DECODE_ABS_LEVEL( ), the decoder can decode symbols for ABS_LEVEL_INDEX and iLevel with one load operation, one lookup operation, and one flush operation (and with only one conditional branch to check for the escape mode for value A6). For the VLCs shown in the first VLC table (701), the highest possible combined length for the symbols for ABS_LEVEL_INDEX and iLevel is 7 bits, so every valid combination of the symbols is represented at least once within the 256-entry lookup table (711). The lookup table (711) does not include symbols after iLevel in the respective entries of the table (711).

A different multi-symbol lookup table (not shown) includes symbols from the second VLC table (702) for the 8-bit index values. For the VLCs shown in the second VLC table (702), the highest possible combined length for the symbols for ABS_LEVEL_INDEX and iLevel is 8 bits, so every valid combination of the symbols is still represented in the 256-entry lookup table.

To decode a non-zero coefficient value, a decoder updates a tracking variable that depends on content of the picture, as detailed in the JPEG XR standard. To adapt the multi-symbol lookup table, the decoder uses the tracking variable to select the multi-symbol lookup table from among two available multi-symbol lookup tables. To decode a non-zero value coefficient, the decoder loads x bits of the bitstream from a buffer and searches for the loaded x bits in the multi-symbol lookup table, where x is 8. The decoder determines y bits that represent an absolute level value symbol and, depending on the absolute level value symbol, a level bits symbol, indicated by the loaded x bits, then flushes the y bits from the buffer.

For a run value, for some values of run of zero-value coefficients, the decoder decodes a VLC for a RUN_INDEX syntax element and also decodes 0, 1, 2 or 3 extra bits for a RUN_REF syntax element. The highest combined length for the symbols RUN_INDEX and RUN_REF is 7 bits. The number of extra bits for the RUN_REF syntax element depends on the value of RUN_INDEX and the maximum run (iMaxRun) currently possible. There are nine possible values for iMaxRun.

In a multi-symbol lookup table for RUN_INDEX and RUN_REF, each row associates a 7-bit index value with a symbol for RUN_INDEX and, in some cases, a symbol for 1, 2, or 3 extra bits for RUN_REF. Because the number of bits for RUN_REF depends in part on the value of iMaxRun (not represented within entries of the table), nine different multi-symbol lookup tables are used for the nine different values of iMaxRun. Each of the nine available lookup tables has 128 entries. By adapting the routine DECODE_RUN( ) and selecting an appropriate one of the nine lookup tables, the decoder can decode symbols for RUN_INDEX and RUN_REF with one load operation, one lookup operation, and one flush operation.

Thus, to decode a run value, a decoder determines a maximum run value. To adapt the multi-symbol lookup table, the decoder uses the maximum run value to select the multi-symbol lookup table from among multiple available multi-symbol lookup tables (one for each of the possible values of iMaxRun). Then, to decode a run value, the decoder loads x bits of the bitstream from a buffer and searches for the loaded x bits in the multi-symbol lookup table. The decoder determines y bits (representing a run index symbol and, depending on the run index symbol, a run reference symbol, as indicated by the loaded x bits), then flushes the y bits from the buffer.

IV. Truncated Inverse Frequency Transforms

When a picture of image or video content is encoded, the picture is typically divided into blocks (e.g., 8×8 blocks). An encoder applies a frequency transform to values for a given one of the blocks to produce transform coefficients for the block. A full inverse frequency transform for a block can be computationally intensive, especially if the implementation of the transform uses floating point multiplications.

Consider, for example, an 8×8 block of sample values or prediction residual values. With a typical block-based transform, the values of the block are converted to 64 transform coefficients, which are organized in a logical two-dimensional (2D) arrangement. Conventionally, horizontal frequency increase from left to right of the logical 2D arrangement, and vertical frequency increases from top to bottom of the logical 2D arrangement. The coefficient with the lowest horizontal frequency and lowest vertical frequency (labeled the DC coefficient) is assigned to the top left corner of the logical 2D arrangement. The other coefficients are labeled AC coefficients. The AC coefficient with the highest horizontal frequency but lowest vertical frequency is assigned to the top right corner of the logical 2D arrangement, the AC coefficient with the highest vertical frequency but lowest horizontal frequency is assigned to the bottom left corner of the logical 2D arrangement, and the AC coefficient with the highest horizontal frequency and highest vertical frequency is assigned to the bottom right corner of the logical 2D arrangement. During decoding, AC coefficients are entropy decoded and assigned to positions in the logical 2D arrangement according to a scan pattern, which maps the coefficients from a logical one-dimensional (1D) arrangement (which tends to cluster zero-value coefficients to facilitate run-length or run-level coding) into the logical 2D arrangement. The actual implementation of the logical 2D arrangement can use a 2D array in which indices i, j indicate coefficient positions, a 1D array in which array indices h (where h=8i+j) indicate coefficient positions, or some other data structure.

A frequency transform tends to cause compaction of the energy of the values of the block, such that lower frequency coefficients have higher amplitude values and higher frequency coefficients have lower amplitude values. When the transform coefficients are quantized for the sake of compression, many of the transform coefficients have values of zero. Often, only a few transform coefficients (usually lower frequency coefficients) have non-zero values after quantization. For an 8×8 block, for example, in many cases the non-zero coefficients are localized within a 4×4 section of lower frequency coefficients, a 2×2 section of lower frequency coefficients, or even a 1×1 section (DC coefficient).

To reduce the computational cost of performing inverse frequency transforms, a decoder can selectively truncate an inverse frequency transform to exploit the relative rareness of non-zero coefficients. For many blocks, a decoder need not perform a full inverse frequency transform. Selectively using a truncated inverse frequency transform can speed up decoding and/or save computing cycles, while still producing results that are a bit-exact match for results from a full inverse frequency transform.

In particular, a truncated inverse frequency transform can be simplified by removing operations that would involve multiplication by zero or addition of zero, considering which transform coefficients are zero-value coefficients. Such zero-value coefficients effectively make no contribution to the values reconstructed by the inverse frequency transform. When transform coefficients are de-quantized, the same logic can be used to avoid irrelevant de-quantization operations for zero-value coefficients, as explained below.

For example, for an 8×8 block, the full inverse frequency transform can be implemented as an 8×8 2D transform or two separable 8×1 1D transforms applied to rows and columns of transform coefficients for the block. If the non-zero coefficients for the block are localized in a 4×4 section or 2×2 section, the full transform can be truncated by eliminating operations that involve multiplication by zero or addition of zero, then using the truncated transform. Or, the full transform can be truncated by replacing the full transform with a smaller transform such as 4×4 or 2×2 (or by replacing separable parts of the full transform with smaller transforms such as 4×1 or 2×1) for the section that includes the non-zero coefficients, and repeating intermediate and final result values as appropriate to reach the appropriate full size for the block. If the only non-zero coefficient for the block is the DC coefficient (1×1 section), the inverse frequency can simply reconstruct and repeat the average value for the block using the DC coefficient. Whether a decoder uses the full inverse frequency transform or a truncated inverse frequency transform, the transform produces the same results.

A decoder can also adjust de-quantization of the transform coefficients for a block depending on the upper vertical frequency among non-zero coefficients for the block. For example, if the upper vertical frequency among non-zero coefficients is 0 (indicating non-zero coefficients in only the first row), de-quantizing the transform coefficients of that row is equivalent to de-quantizing the transform coefficients for all rows. With the adjusted de-quantization, the decoder only partially de-quantizes the transform coefficients, but the de-quantization still yields the same results as full de-quantization.

A selectively truncated inverse frequency transform can be used in any implementation for an inverse DCT or integer approximation thereof. For example, the selectively truncated inverse frequency transform can be used in decoding according to the JPEG standard, MJPEG standard, MPEG-2 standard, MPEG-4 standard or VC-1 standard.

A. Example Technique for Selective Truncated Inverse Frequency Transform.

Figure 8:
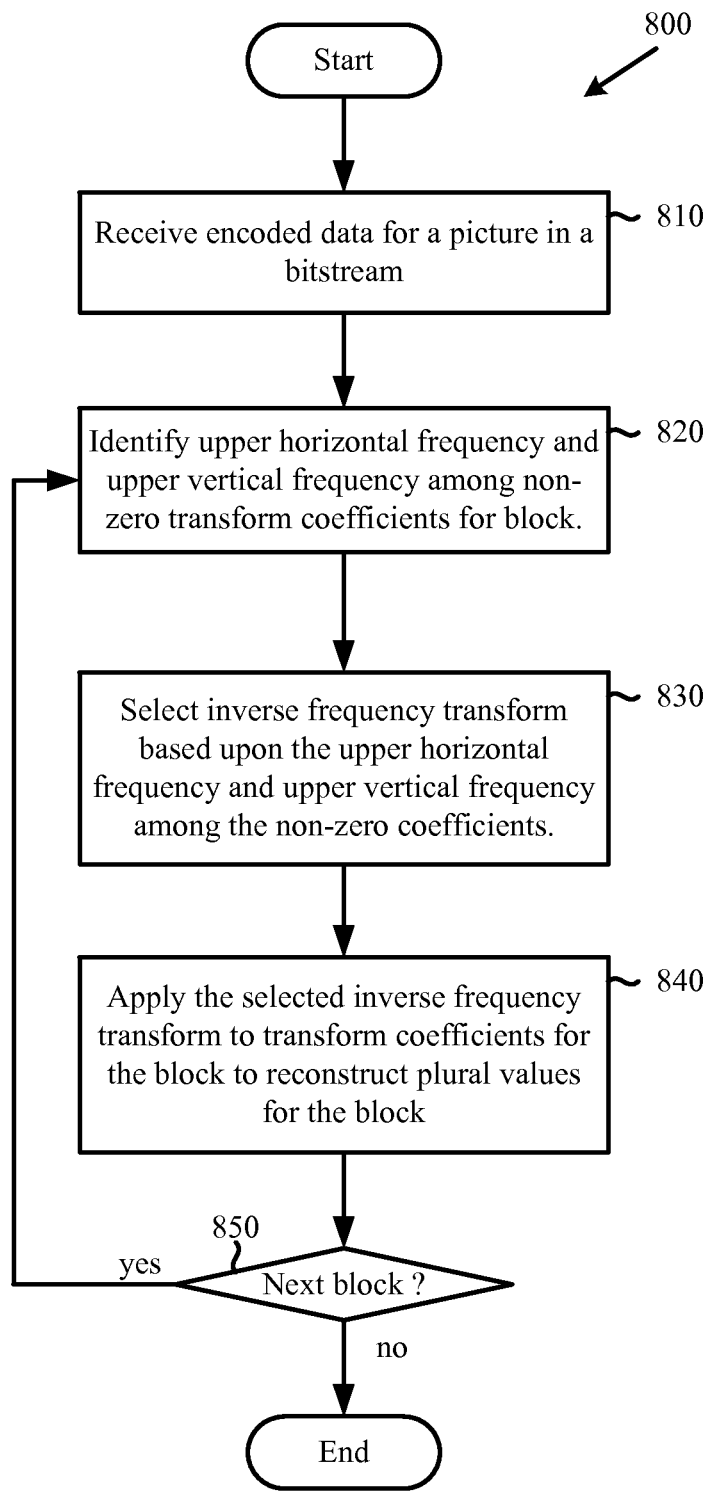
FIG. 8 is a flowchart showing an example technique for selectively performing a truncated inverse frequency transform.

FIG. 8 shows an example technique (800) for selectively performing a truncated inverse frequency transform. A computing device that implements an image or video decoder, such as the decoder (200) shown in FIG. 2, or other tool can perform the technique (800).

The tool receives (810) encoded data for a picture in a bitstream and decodes multiple blocks of the picture. As used herein, the term "block" can indicate a 16×16 macroblock, 8×8 block, smaller sub-block, or any other arrangement of values for media content.

For a given block of the multiple blocks, the tool identifies (820) an upper horizontal frequency and upper vertical frequency among non-zero coefficients in the transform coefficients for the block. For example, the upper horizontal frequency is the largest horizontal coordinate for a position having a non-zero value in a logical 2D arrangement of transform coefficients for the block, and the upper vertical frequency is the largest vertical coordinate for a position having a non-zero value in the logical 2D arrangement of transform coefficients for the block. Alternatively, the upper horizontal frequency and upper vertical frequency among non-zero coefficients are identified for transform coefficients having a different representation during decoding.

The tool can track the upper horizontal frequency and upper vertical frequency while entropy decoding the transform coefficients for the block and scanning the transform coefficients from a logical 1D arrangement to a logical 2D arrangement according to a scan pattern. FIG. 9 shows pseudocode listings (901, 902) for an example approach to tracking the upper horizontal frequency and upper vertical frequency among non-zero coefficients for a block. Alternatively, the tool uses another approach to identify the upper horizontal frequency and upper vertical frequency among non-zero coefficients, for example, tracking with a single value whichever one of the upper horizontal frequency or upper vertical frequency is higher.

The tool selects (830) one of multiple available inverse frequency transforms having different sizes based upon the upper horizontal frequency and upper vertical frequency for non-zero coefficients. For example, for an 8×8 block, the different sizes of the inverse frequency transforms can include a m'm square or m×n rectangle, wherein m is any of 1, 2, 4 and 8, and n is any of 1, 2, 4 and 8. The tool selects an inverse frequency transform having a size that includes the non-zero coefficients. When this is smaller than the full transform, unnecessary operations can be avoided to speed up decoding.

Next, the tool applies (840) the selected inverse frequency transform to at least some of the transform coefficients for the given block to reconstruct sample values or prediction residual values for the block. The tool then checks (850) whether to continue with the next block or finish.

For the sake of presentation, FIG. 8 shows repetition of the technique (800) on a block-by-block basis for a picture or part (e.g., partition, slice) of a picture. Alternatively, the technique is repeated on some other basis. For the sake of simplicity, FIG. 8 does not show the ways that selective truncated inverse transforms can be integrated with other innovations described herein.

B. Example Tracking of Upper Frequency for Non-Zero Coefficients.

Figure 10:
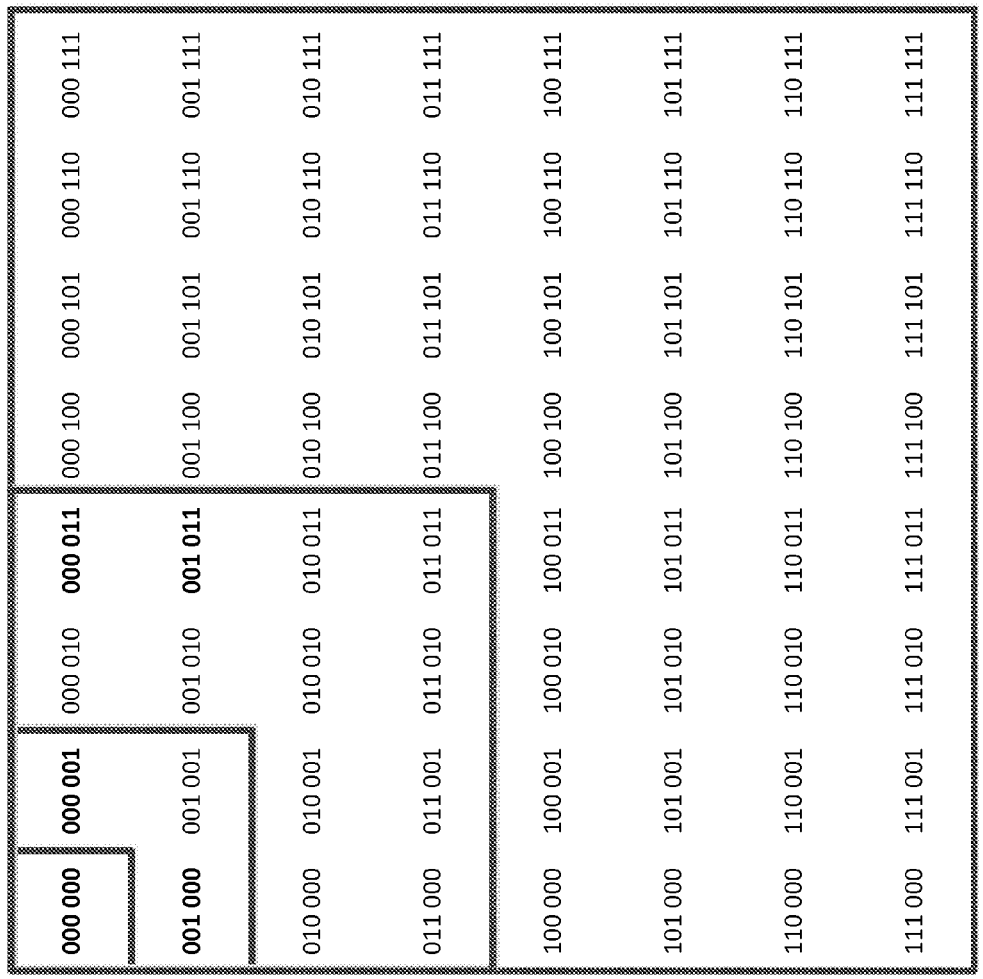
FIG. 10 is a diagram showing determination of an overall defining frequency for non-zero coefficients of an example block, following the pseudocode listing of FIG. 9.

FIG. 9 shows an example technique for determining an upper frequency defining a section around non-zero coefficients of a block. FIG. 10 illustrates determination of an upper frequency defining a section around non-zero coefficients for an example block, following the pseudocode listings of FIG. 9. In FIGS. 9 and 10, the example block is an 8×8 block. Alternatively, the block can have another size.

The first pseudocode listing (901) shows an entropy decoding/scanning loop for AC coefficients of an 8×8 block. An index variable is initialized to the first AC coefficient (index =1), a non-zero coefficient index is initialized to zero (NonZeroIndices=0), and AC coefficients are initialized to zero (not shown). Using Huffman decoding, the decoder decodes a symbol H for a run-level pair or end of block, then advances the index variable to skip the run of zero-value coefficients indicated by the symbol H. Details of the Huffman coding are omitted, but the Huffman decoding can use a multi-symbol lookup table or another variable length decoding approach. If the symbol H indicates a non-zero coefficient in a run-level pair, the decoder determines the position Z of the non-zero coefficient in the logical 2D arrangement using a scan pattern (Z=ZigZag[Index]), decodes the value of the non-zero coefficient and assigns the value to the position (AC[Z]= . . . ). The entropy decoding/scanning loop continues for the next index, until the last index is reached for the block.

In the entropy decoding/scanning loop, the non-zero coefficient index (NonZeroIndices) is used to track both the upper horizontal frequency and the upper vertical frequency among non-zero coefficients for the block. Three bits of the non-zero coefficient index indicate the upper vertical frequency, and three other bits of the non-zero coefficient index indicate the upper horizontal frequency. As shown in the statement in boldface, the tracking uses a bitwise OR operation to update the non-zero coefficient index (NonZeroIndices|=Z). The bitwise OR of positions for the non-zero coefficients provides an efficient way to track the upper horizontal frequency and upper vertical frequency, compared to using two different branches of track the upper horizontal frequency and upper vertical frequency.

Based on the tracked upper horizontal frequency and upper vertical frequency, the decoder can select a full inverse frequency transform or appropriately truncated inverse frequency transform that still includes the non-zero coefficients of the block. For example, for an 8×8 block, the decoder selects between an 8×8, 4×4, 2×2 or 1×1 inverse frequency transform. Or, the decoder selects between a wider set of available inverse frequency transforms that also includes non-square sizes such as 8×1, 4×1 and 2×1. Using rectangular sizes of inverse frequency transforms can provide more opportunities to reduce computational complexity. For example, if the upper vertical frequency is 0 (in the range of 0 to 7) and the upper horizontal frequency is 4 (in the range of 0 to 7), a 4×4 inverse frequency transform does not encompass all non-zero coefficients. Instead of using an 8×8 inverse frequency transform, however, a 1×8 inverse frequency transform can be used to provide correct results while speeding up decoding.

FIG. 10 shows an 8×8 block (1001) for which positions in the logical 2D arrangement are indicated in binary form. Positions 0, 1, 3, 8 and 11 have non-zero coefficients, and the binary values for these positions are shown in boldface. The remaining positions in the logical 2D arrangement have zero-value coefficients. The block (1001) shows different sizes (1×1, 2×2, 4×4 and 8×8) for available inverse frequency transforms. In successive iterations of the loop shown in the first pseudocode listing (901) of FIG. 9, a conventional zigzag scan pattern returns the positions Z of non-zero coefficients: 000 001, 001 000, 000 011 and 001 011. After a position is returned, the non-zero coefficient index is updated with a bitwise OR operation: 000 000→000 001→001 001→001 011→001 011. In the final value for the non-zero coefficient index, the first three bits indicate the upper vertical frequency (1, in the range of 0 to 7) and the last three bits indicate the upper horizontal frequency (3, in the range of 0 to 7). For the example block (1001), the decoder selects a 4×4 inverse frequency transform, which encompasses the non-zero coefficients for the block (1001).

After the tracking shown in the first pseudocode listing (901), the non-zero coefficient index (NonZeroIndices) includes the upper horizontal frequency and upper vertical frequency. If the decoder is only switching between square inverse frequency transforms at dyadic increments, the decoder can further simplify the selection by computing the bitwise OR of the first three significant bits and last three significant bits of the non-zero coefficient index, as shown in the second pseudocode listing (902). After that, the last three significant bits $b_2 b_1 b_0$ of the non-zero coefficient index indicate the overall upper frequency category: 000 (1×1), 001 (2×2), 01x (4×4), or 1xx (8×8). If no bits are set, the 1×1 transform is selected since there are no non-zero AC coefficients. If only bit position 0 is set (and bit positions 1 and 2 are clear), the 2×2 transform is selected since the non-zero coefficient(s) are within the 2×2 section, and the AC coefficients outside the 2×2 section are zero-value coefficients. If bit position 1 is set (and bit position 2 is clear), the 4×4 transform is selected, since AC coefficients outside the 4×4 quadrant are zero-value coefficients. Finally, if bit position 2 is set, the 8×8 transform is selected since there is at least one non-zero coefficient outside the 4×4 section. In FIG. 10, the bitwise OR of the first three bits 001 and last three bits 011 of NonZeroIndices yields 011. The overall upper frequency category is not simply the higher of the upper horizontal frequency and upper vertical frequency (e.g., 001|010=011, not 010) but nevertheless provides an efficient way to switch between 1×1, 2×2, 4×4 and 8×8 sizes based on the upper horizontal frequency and the upper vertical frequency.

For the sake of simplicity, FIG. 9 does not show the ways that selective truncated inverse transforms can be integrated with other innovations described herein.

V. Using Restart Markers to Facilitate Parallel Decoding

Sometimes, a decoder has processor units (processing cores) available to it that the decoder is unable to utilize effectively for decoding. For example, the decoder may be unable to separate decoding tasks in a way that facilitates assignment of the tasks to different processing cores.

In order to enhance performance when a decoder can use multiple cores for decoding, and at the same time reduce the latency, the decoder can partition pictures based on restart markers in the bitstream. The decoder can then use different threads to decode different partitions in parallel. To facilitate parallel decoding, an encoder outputs restart markers in the encoded data in the bitstream. For example, the encoder introduces a restart marker every 8 blocks within a single row, every 16 blocks within a row, or at some other interval. The encoder can make decisions during encoding that are consistent with parallel decoding, so as to avoid certain coding/decoding dependencies from block-to-block between partitions. For example, the encoder avoids DC prediction across partition boundaries when encoding DC transform coefficients.

In particular, use of restart markers to mark partitions for parallel decoding is useful for encoding/decoding according to the MJPEG standard. Many Web camera devices output video in a MJPEG bitstream. When decoding high definition video encoded as a MJPEG bitstream, use of restart markers to determine partitions for parallel decoding can improve performance. Alternatively, encoded data in another format and/or another playback scenario includes restart markers that a decoder can use to determine partitions for parallel decoding.

The syntax of restart markers depends on implementation. For example, in some implementations, a restart marker is 16 bits having a defined pattern. Alternatively, a restart marker has another number of bits. The use of restart markers increases overall bit rate, which hurts rate-distortion performance, and can also hurt encoding efficiency when encoding is constrained to avoid dependencies between partitions.

When restart markers appear at a regular interval in the bitstream, the decoder can skip a certain amount of bits in the bitstream during scanning For example, depending on the regular interval, the decoder determines a base amount of bits per partition for the partitions (e.g., minimum amount of bits per partition). The decoder then uses the base amount of bits to skip scanning of at least some of the encoded data in the bitstream.

When detection of restart markers precedes entropy decoding, the decoder can simplify entropy decoding by eliminating certain conditional check branches from entropy decoding. For example, branches of the entropy decoding that check for a restart marker are eliminated. By eliminating an expensive special case check, the decoder speeds up entropy decoding for the different partitions in parallel.

Figure 11:
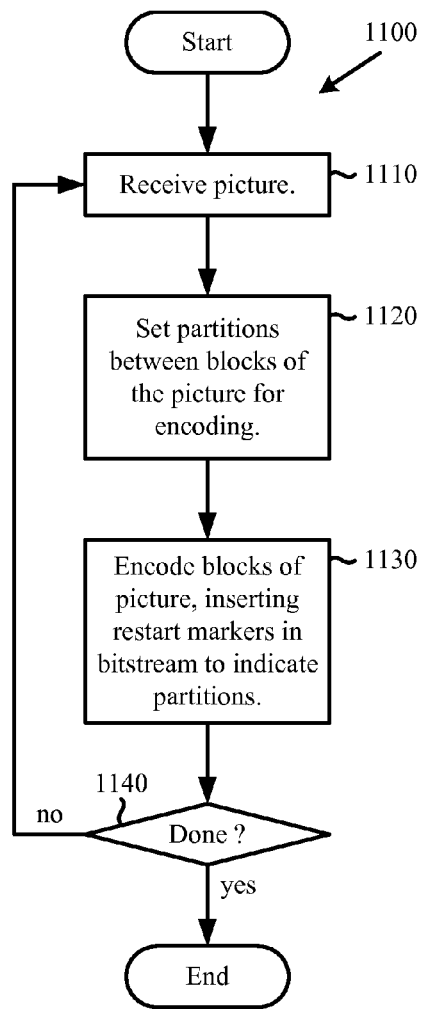
FIGS. 11 and 12 are flowcharts showing example techniques for encoding and decoding, respectively, in which restart markers indicate partitions of blocks.

FIG. 11 shows an example technique (1100) for inserting restart markers to identify partitions in a bitstream. A computing device that implements an image or video encoder can perform the technique (1100). Alternatively, another tool performs the technique (1100).

The tool receives (1110) a picture and sets (1120) partitions between blocks of the picture for encoding. For example, the tool sets the partitions at a regular interval. The tool then encodes (1130) blocks of the picture, inserting restart markers in the bitstream to indicate the partitions.

The tool checks (1140) whether to continue with the next picture or finish. For the sake of presentation, FIG. 11 shows repetition of the technique (1100) on a picture-by-picture basis. Alternatively, the technique is repeated on some other basis.

Figure 12:
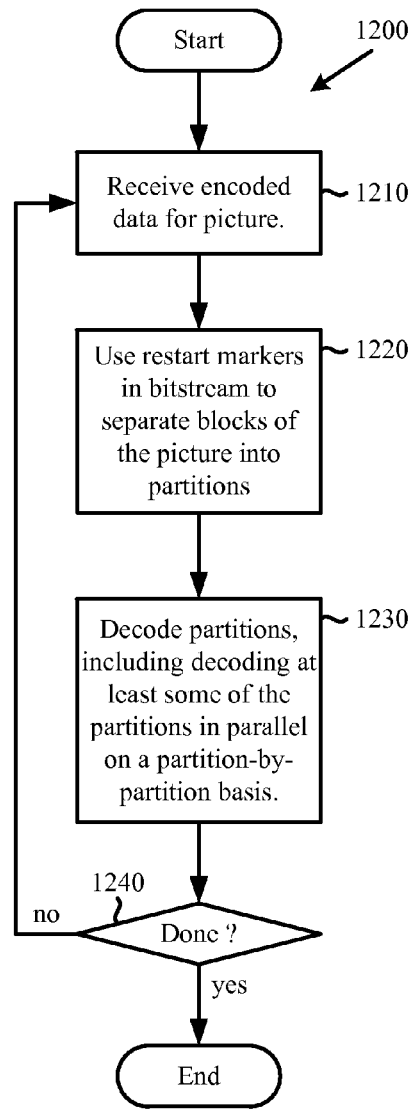

FIG. 12 shows an example technique (1200) for using restart markers to identify partitions for parallel decoding. A computing device that implements an image or video decoder, such as the decoder (200) shown in FIG. 2, or other tool can perform the technique (1200).

To start, the tool receives (1210) encoded data for a picture in a bitstream. The tool uses (1220) restart markers in the bitstream to organize blocks of the picture as multiple partitions. The restart markers can appear in the bitstream at a regular interval (e.g., every 8 blocks, every 16 blocks). Alternatively, the restart markers appear at irregular locations in the bitstream.

The tool then decodes (1230) at least some of the multiple partitions in parallel on a partition-by-partition basis using multiple processing cores. In the decoding, the decoder assigns different threads to different partitions that are decoded in parallel.

The tool checks (1240) whether to continue with the next picture or finish. For the sake of presentation, FIG. 12 shows repetition of the technique (1200) on a picture-by-picture basis. Alternatively, the technique is repeated on some other basis. For the sake of simplicity, FIG. 12 does not show the ways that parallel decoding of partitions can be integrated with other innovations described herein.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing device that implements an image or video decoder, a method comprising:
    receiving encoded data for a picture in a bitstream, the encoded data including plural symbols, each of the plural symbols being represented in the encoded data with a variable length code (VLC) or fixed length code (FLC), wherein the plural symbols include, for each of one or more run-level pairs for a block of the picture:
        a run-level pair symbol indicating a run length of zero-value coefficients and a level category of a non-zero coefficient for the run-level pair;
        a sign value symbol indicating a sign for the non-zero coefficient; and
        depending on value of the level category of the non-zero coefficient, an offset value symbol indicating extra bits for the non-zero coefficient; and
    with the computing device that implements the image or video decoder, decoding the encoded data for the picture, including:

adapting, during the decoding the encoded data for the picture, a multi-symbol lookup table to use in decoding the plural symbols in the encoded data for the picture, wherein the multi-symbol lookup table has up to $2^x$ entries indexed by possible combinations of x-bit values, respectively, wherein at least one entry of the multi-symbol lookup table associates a series of VLCs leading the x-bit value for that entry with a series of multiple symbols such that the series of VLCs consumes as many bits as possible from the x-bit value but leaves as undefined any bits of the x-bit value that indicate a partial symbol, and wherein the adapting the multi-symbol lookup table includes:
  after the receiving the encoded data for the picture, reconstructing a VLC table for the picture during the decoding the encoded data for the picture, wherein the VLC table is changeable on a picture-by-picture basis; and
  building the multi-symbol lookup table using the VLC table for the picture reconstructed during the decoding the encoded data for the picture; and
decoding the plural symbols using the multi-symbol lookup table, including:
loading x bits of the bitstream from a buffer;
searching for the loaded x bits in the multi-symbol lookup table;
if the loaded x bits indicate one or more whole symbols for one or more of the run-level pairs:
  determining y bits that represent the one or more whole symbols indicated by the loaded x bits;
  flushing the y bits from the buffer; and
  if the one or more whole symbols indicated by the loaded x bits only partially indicate a given one of the run-level pairs, then:
    loading z additional bits of the bitstream from the buffer to determine any remaining symbols for the given run-level pair; and
    flushing the z bits from the buffer;
otherwise, if the loaded x bits indicate a partial symbol:
  loading z additional bits of the bitstream from the buffer to determine a run-level pair symbol, a sign value symbol, and, depending on the run-level pair symbol, an offset value symbol, wherein the run-level pair symbol, sign value symbol and, if present, offset value symbol consume w bits of the loaded x+z bits, and wherein $x<w<=x+z$; and
  flushing the w bits from the buffer.

2. The method of claim 1 wherein x is 8, 10 or 12, and wherein at least one other entry of the multi-symbol lookup table indicates the x-bit value for the other entry represents a partial symbol.

3. The method of claim 1 wherein the decoding the encoded data for the picture further includes decoding plural blocks of the picture, including, for a given block of the plural blocks:
identifying an upper horizontal frequency and upper vertical frequency among non-zero coefficients in plural transform coefficients for the given block;
selecting one of plural available inverse frequency transforms having different sizes based upon the upper horizontal frequency and the upper vertical frequency among non-zero coefficients for the given block; and
applying the selected inverse frequency transform to at least some of the plural transform coefficients for the given block to reconstruct plural sample values or prediction residual values for the given block.

4. A computer-readable memory device or storage device storing computer-executable instructions for causing a computing device, when programmed thereby, to perform:
receiving encoded data for a picture in a bitstream, the encoded data including plural symbols, each of the plural symbols being represented in the encoded data with a variable length code (VLC) or fixed length code (FLC), wherein the plural symbols include, for each of one or more run-level pairs for a block of the picture:
  a run-level pair symbol indicating a run length of zero-value coefficients and a level category of a non-zero coefficient for the run-level pair;
  a sign value symbol indicating a sign for the non-zero coefficient; and
  depending on value of the level category of the non-zero coefficient, an offset value symbol indicating extra bits for the non-zero coefficient; and
decoding the encoded data for the picture, including:
  adapting, during the decoding the encoded data for the picture, a multi-symbol lookup table to use in decoding the plural symbols in the encoded data for the picture, wherein the multi-symbol lookup table has up to $2^x$ entries indexed by possible combinations of x-bit values, respectively, wherein at least one entry of the multi-symbol lookup table associates a series of VLCs leading the x-bit value for that entry with a series of multiple symbols such that the series of VLCs consumes as many bits as possible from the x-bit value but leaves as undefined any bits of the x-bit value that indicate a partial symbol, and wherein the adapting the multi-symbol lookup table includes:
    after the receiving the encoded data for the picture, reconstructing a VLC table for the picture during the decoding the encoded data for the picture, wherein the VLC table is changeable on a picture-by-picture basis; and
    building the multi-symbol lookup table using the VLC table for the picture reconstructed during the decoding the encoded data for the picture; and
  decoding the plural symbols using the multi-symbol lookup table, including:
    loading x bits of the bitstream from a buffer;
    searching for the loaded x bits in the multi-symbol lookup table;
    if the loaded x bits indicate one or more whole symbols for one or more of the run-level pairs:
      determining y bits that represent the one or more whole symbols indicated by the loaded x bits;
      flushing the y bits from the buffer; and
      if the one or more whole symbols indicated by the loaded x bits only partially indicate a given one of the run-level pairs, then:
        loading z additional bits of the bitstream from the buffer to determine any remaining symbols for the given run-level pair; and
        flushing the z bits from the buffer;
    otherwise, if the loaded x bits indicate a partial symbol:
      loading z additional bits of the bitstream from the buffer to determine a run-level pair symbol, a sign value symbol, and, depending on the run-level pair symbol, an offset value symbol, wherein the run-level pair symbol, sign value symbol and, if present, offset value symbol consume w bits of the loaded x+z bits, and wherein x<w<=x+z; and flushing the w bits from the buffer.

5. A computing device comprising a processor and memory, wherein the computing device implements an image or video decoder adapted to:

receive encoded data for a picture in a bitstream, the encoded data including plural symbols, each of the plural symbols being represented in the encoded data with a variable length code (VLC) or fixed length code (FLC), wherein the plural symbols include, for each of one or more run-level pairs for a block of the picture:

a run-level pair symbol indicating a run length of zero-value coefficients and a level category of a non-zero coefficient for the run-level pair;

a sign value symbol indicating a sign for the non-zero coefficient; and depending on value of the level category of the non-zero coefficient, an offset value symbol indicating extra bits for the non-zero coefficient; and decode the encoded data for the picture, including:

adapt, during the decoding the encoded data for the picture, a multi-symbol lookup table to use in decoding the plural symbols in the encoded data for the picture, wherein the multi-symbol lookup table has up to $2^x$ entries indexed by possible combinations of x-bit values, respectively, wherein at least one entry of the multi-symbol lookup table associates a series of VLCs leading the x-bit value for that entry with a series of multiple symbols such that the series of VLCs consumes as many bits as possible from the x-bit value but leaves as undefined any bits of the x-bit value that indicate a partial symbol, including, to adapt the multi-symbol lookup table:

after receipt of the encoded data for the picture at the computing device, reconstruct a VLC table for the picture during decoding of the encoded data for the picture, wherein the VLC table is changeable on a picture-by-picture basis; and build the multi-symbol lookup table using the VLC table for the picture reconstructed during the decoding the encoded data for the picture; and decode the plural symbols using the multi-symbol lookup table, including:

load x bits of the bitstream from a buffer;

search for the loaded x bits in the multi-symbol lookup table;

if the loaded x bits indicate one or more whole symbols for one or more of the run-level pairs:

determine y bits that represent the one or more whole symbols indicated by the loaded x bits;

flush the y bits from the buffer; and if the one or more whole symbols indicated by the loaded x bits only partially indicate a given one of the run-level pairs, then:

load z additional bits of the bitstream from the buffer to determine any remaining symbols for the given run-level pair; and flush the z bits from the buffer;

otherwise, if the loaded x bits indicate a partial symbol:

load z additional bits of the bitstream from the buffer to determine a run-level pair symbol, a sign value symbol, and, depending on the run-level pair symbol, an offset value symbol, wherein the run-level pair symbol, sign value symbol and, if present, offset value symbol consume w bits of the loaded x+z bits, and wherein x<w<=x+z; and flush the w bits from the buffer.

6. The computer-readable memory device or storage device of claim 4 wherein x is 8, 10 or 12, and wherein at least one other entry of the multi-symbol lookup table indicates the x-bit value for the other entry represents a partial symbol.

7. The computing device of claim 5 wherein x is 8, 10 or 12, and wherein at least one other entry of the multi-symbol lookup table indicates the x-bit value for the other entry represents a partial symbol.

* * * * *